US012189334B2

(12) United States Patent
Miura et al.

(10) Patent No.: US 12,189,334 B2
(45) Date of Patent: Jan. 7, 2025

(54) ELECTROSTATIC CHARGE IMAGE DEVELOPING TONER AND ELECTROSTATIC CHARGE IMAGE DEVELOPER

(71) Applicant: FUJIFILM Business Innovation Corp., Tokyo (JP)

(72) Inventors: Satoshi Miura, Kanagawa (JP); Yoshimasa Fujihara, Kanagawa (JP); Atsushi Sugawara, Kanagawa (JP); Shintaro Anno, Kanagawa (JP); Daisuke Noguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 484 days.

(21) Appl. No.: 17/500,891

(22) Filed: Oct. 13, 2021

(65) Prior Publication Data

US 2022/0382177 A1 Dec. 1, 2022

(30) Foreign Application Priority Data

May 25, 2021 (JP) ................................ 2021-087871

(51) Int. Cl.
*G03G 9/08* (2006.01)
*G03G 9/087* (2006.01)
(Continued)

(52) U.S. Cl.
CPC ......... *G03G 9/0821* (2013.01); *G03G 9/0825* (2013.01); *G03G 9/08711* (2013.01);
(Continued)

(58) Field of Classification Search
CPC ............... G03G 9/0821; G03G 9/0825; G03G 9/08711; G03G 9/08755; G03G 9/0924; G03G 9/09733
See application file for complete search history.

(56) References Cited

U.S. PATENT DOCUMENTS 9,703,219 B1 7/2017 Matsubara et al.
10,146,147 B2 * 12/2018 Kayamori .............. G03G 9/092
(Continued)

FOREIGN PATENT DOCUMENTS

JP 2010091625 4/2010
JP 2011017838 1/2011
(Continued)

OTHER PUBLICATIONS

National Center for Biotechnology Information. "PubChem Compound Summary for CID 135481898, 3,3'-[(2-Methyl-1,3-phenylene)diimino]bis[4,5,6,7-tetrachloro-1H-isoindol-1-one]" PubChem, https://pubchem.ncbi.nlm.nih.gov/compound/135481898. Accessed May 23, 2024. (Year: 2024).*
(Continued)

*Primary Examiner* — Peter L Vajda
*Assistant Examiner* — Boone Alexander Evans
(74) *Attorney, Agent, or Firm* — JCIPRNET

(57) ABSTRACT

An electrostatic charge image developing toner includes a toner particle that contains a binder resin having an acid value of 5 mgKOH/g or more and 25 mgKOH/g or less, and a pigment having an isoindoline skeleton, in which a total Net intensity $N_A$ of an alkali metal and an alkaline earth metal, which is measured by fluorescent X-ray analysis, in the toner particle is 1.50 kcps or more and 4.00 kcps or less.

17 Claims, 3 Drawing Sheets

(51) Int. Cl.
*G03G 9/09* (2006.01)
*G03G 9/097* (2006.01)

(52) U.S. Cl.
CPC ....... *G03G 9/08755* (2013.01); *G03G 9/0924* (2013.01); *G03G 9/09733* (2013.01)

(56) References Cited

U.S. PATENT DOCUMENTS

| | | | | |
|---|---|---|---|---|
| 2011/0008723 | A1 | 1/2011 | Morita et al. | |
| 2014/0295345 | A1* | 10/2014 | Ojima | G03G 9/09392 430/137.11 |
| 2017/0329246 | A1* | 11/2017 | Yamawaki | G03G 9/08711 |
| 2018/0364600 | A1* | 12/2018 | Fuwa | G03G 9/0912 |
| 2019/0384201 | A1* | 12/2019 | Kadonome | G03G 9/09708 |
| 2020/0142329 | A1* | 5/2020 | Yamawaki | G03G 9/08782 |

FOREIGN PATENT DOCUMENTS

| | | |
|---|---|---|
| JP | 2017215498 | 12/2017 |
| JP | 2021026129 | 2/2021 |

OTHER PUBLICATIONS

National Center for Biotechnology Information. "PubChem Compound Summary for CID 135481899, 4,5,6,7-Tetrachloro-3-[4-[(4,5,6,7-tetrachloro-3-oxoisoindol-1-yl)amino]anilino]isoindol-1-one" PubChem, https://pubchem.ncbi.nlm.nih.gov/compound/135481899. Accessed May 23, 2024. (Year: 2024).*

"Notice of Reasons for Refusal of Japan Counterpart Application", issued on Sep. 10, 2024, with English translation thereof, p. 1-p. 6.

* cited by examiner

ELECTROSTATIC CHARGE IMAGE DEVELOPING TONER AND ELECTROSTATIC CHARGE IMAGE DEVELOPER

CROSS-REFERENCE TO RELATED APPLICATIONS

This application is based on and claims priority under 35 USC 119 from Japanese Patent Application No. 2021-087871 filed May 25, 2021.

BACKGROUND

(i) Technical Field

The present invention relates to an electrostatic charge image developing toner and an electrostatic charge image developer.

(ii) Related Art

Methods of visualizing image information, such as electrophotographic methods, are currently used in various fields. In the electrophotographic methods, an electrostatic charge image is formed as image information on a surface of an image holding member by charging the surface thereof and forming an electrostatic charge image. Further, a toner image is formed on the surface of the image holding member using a developer containing a toner, the toner image is transferred to a recording medium, and the toner image is fixed to the recording medium. The image information is visualized as an image by performing these steps.

For example, JP2011-17838A discloses "an electrostatic charge image developing toner that contains a pigment having an isoindoline skeleton (for example, C. I. Pigment Yellow 185)".

SUMMARY

Aspects of non-limiting embodiments of the present disclosure relate to an electrostatic charge image developing toner that suppresses image unevenness occurring in a case where a high-density image is repeatedly formed in a low-temperature and low-humidity environment, as compared with an electrostatic charge image developing toner containing a toner particle which contains a binder resin having an acid value of 5 mgKOH/g or more and 25 mgKOH/g or less and a yellow pigment having an isoindoline skeleton, in which a total Net intensity NZ of an alkali metal and an alkaline earth metal, measured by fluorescent X-ray analysis, in the toner particle is less than 1.50 kcps.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for achieving the above-described object includes the following aspects.

According to an aspect of the present disclosure, there is provided an electrostatic charge image developing toner including: a toner particle that contains a binder resin having an acid value of 5 mgKOH/g or more and 25 mgKOH/g or less, and a pigment having an isoindoline skeleton, in which a total Net intensity $N_A$ of an alkali metal and an alkaline earth metal, which is measured by fluorescent X-ray analysis, in the toner particle is 1.50 kcps or more and 4.00 kcps or less.

BRIEF DESCRIPTION OF THE DRAWINGS

Exemplary embodiment(s) of the present invention will be described in detail based on the following figures, wherein.

DETAILED DESCRIPTION

Figure 1:
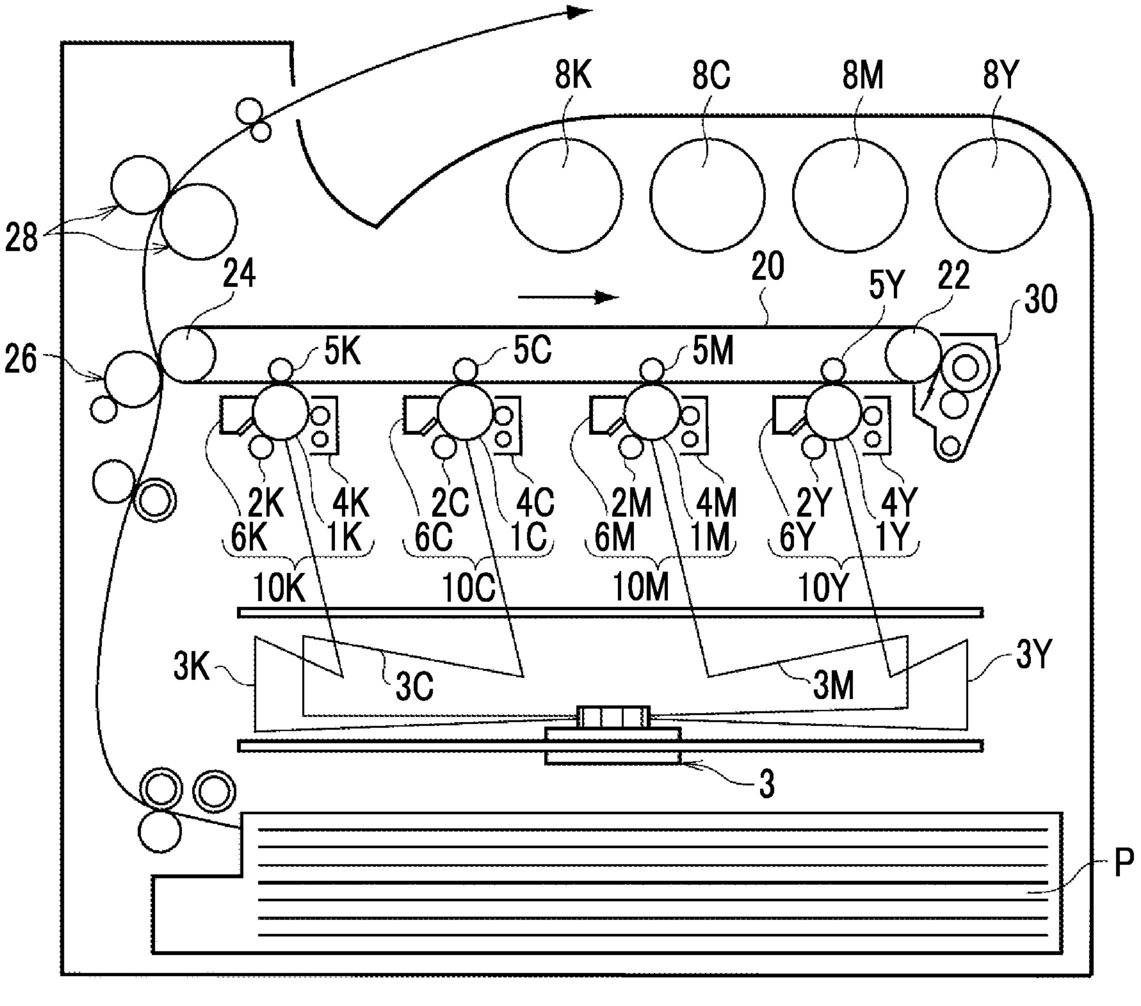
FIG. 1 is a schematic configuration view showing an example of an image forming device according to the present exemplary embodiment.

Hereinafter, exemplary embodiments that are examples of the present invention will be described. The following descriptions and examples merely illustrate the exemplary embodiments, and do not limit the scope of the exemplary embodiments.

In the present specification, a numerical range shown using "to" indicates a range including numerical values described before and after "to" as a minimum value and a maximum value.

In a numerical range described in a stepwise manner in the present specification, an upper limit or a lower limit described in a certain numerical range may be replaced with an upper limit or a lower limit in another numerical range described in a stepwise manner. Further, in a numerical range described in the present specification, an upper limit or a lower limit described in the numerical range may be replaced with a value shown in an example.

In the present disclosure, the meaning of the term "step" includes not only an independent step but also a step whose intended purpose is achieved even in a case where the step is not clearly distinguished from other steps.

In the present disclosure, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present specification, each component may include a plurality of kinds of substances corresponding to each component. In the present specification, in a case where a plurality of kinds of substances corresponding to each component in a composition are present, the amount of each component in the composition indicates the total amount of the plurality of kinds of substances present in the composition unless otherwise specified.

In the present specification, each component may include a plurality of kinds of particles corresponding to each component. In a case where a plurality of kinds of particles corresponding to each component are present in a composition, the particle diameter of each component indicates the value of a mixture of the plurality of kinds of particles present in the composition.

In the present specification, an "electrostatic charge image developing toner" is also simply referred to as a "toner", and an "electrostatic charge image developer" is also simply referred to as a "developer".

In the present specification, an "alkali metal" indicates Li, Na, K, Rb, Cs, or Fr.

Further, an "alkaline earth metal" indicates Be, Mg, Ca, Sr, Ba, or Ra.

Electrostatic Charge Image Developing Toner

A toner according to the present exemplary embodiment contains a toner particle which contains a binder resin having an acid value of 5 mgKOH/g or more and 25 mgKOH/g or less, and a pigment having an isoindoline skeleton, in which a total Net intensity $N_A$ of an alkali metal and an alkaline earth metal, which is measured by fluorescent X-ray analysis, in the toner particle is 1.50 kcps or more and 4.00 kcps or less.

With the above-described configuration, the toner according to the present exemplary embodiment suppresses image unevenness that occurs in a case where a high-density image is repeatedly formed in a low-temperature and low-humidity environment. The reason for this is assumed as follows.

Since the pigment having an isoindoline skeleton represented by C. I. Pigment Yellow 185 (hereinafter, also simply referred to as the "pigment") has an amide bond, in a case where the acid value of the binder resin is high, aggregation of the pigment may occur in a case of granulation of toner particles. It is considered that since the compatibility between the amide bond of the pigment and the binder resin is low, the pigments interact with each other for stabilization, and thus aggregation of the pigment occurs.

Further, the pigment having an isoindoline skeleton has the above-described characteristics and is also compatible with water. Therefore, for example, in a case where toner particles are granulated in an aqueous medium using an aggregation coalescence method, the pigment is easily exposed to the surface of each toner particle. Further, as described above, in a case where a binder resin having a high acid value such as a polyester resin is used, aggregation of the pigment also occurs, and thus the pigment is easily exposed to the surface of the toner particle. In particular, in a case where toner particles are granulated using the aggregation coalescence method, since an acid and an alkali are added together with heat, the pigment is less likely to be taken into the toner particles and thus easily exposed to the surface of the toner particle.

In a case where the pigment is exposed to the surface of the toner particle, the adhesiveness of an external additive at a portion where the pigment is exposed is insufficient. In a case where a high-density image is repeatedly formed in a low-temperature and low-humidity environment in a state where the adhesiveness of the external additive is insufficient, the external additive is easily released from the toner particles, and the released external additive is aggregated when cleaned on an image holding member (a photoreceptor or the like) and slips through the cleaning part. The aggregate of the external additive which has slipped through is transferred together with the toner to the recording medium, and this may cause image unevenness during fixation.

Here, a technique (for example, JP2011-17838A) of using a fatty acid amide compound having a structure similar to the structure of the pigment is also used in order to suppress the aggregation of the pigment. However, in a case where a fatty acid amide compound having a structure similar to the structure of the pigment is used, the dispersibility of the pigment is improved, but the interaction between the pigment and the fatty acid amide compound may cause deviation of the color tone and influence on charging and the like. In addition, further improvement in the dispersibility of the pigment is required in order to suppress image unevenness that occurs in a case where a high-density image (for example, an image having an image density of 80% or more) is repeatedly formed in a low-temperature and low-humidity environment (for example, an environment of 10° C. and 15% RH).

Therefore, in the toner according to the present exemplary embodiment, the toner particles contains an alkali metal and an alkaline earth metal such that a binder resin having an acid value of 5 mgKOH/g or more and 25 mgKOH/g or less is applied and the total Net intensity $N_A$ of the alkali metal and the alkaline earth metal is 1.50 kcps or more.

The alkali metal and the alkaline earth metal are electrostatically bonded to a carboxyl group of the binder resin having the above-described acid value in the toner particles. The presence of the bonding portion increases the affinity between the pigment having an isoindoline skeleton and the binder resin. The reason for this is considered to be that localized aggregation with the pigment having an isoindoline skeleton is suppressed due to the electrostatic bond of the alkali metal and the alkaline earth metal to the carboxyl group, and thus the interaction with the entire resin is improved.

Therefore, the aggregation of the pigment in the toner particles is suppressed, the dispersibility is increased, and the exposure of the pigment to the surface of the toner particle is suppressed. As a result, a decrease in the adhesive force of the external additive of the toner particles is suppressed, and generation of an aggregate of the external additive and transfer of the aggregate of the external additive to the recording medium, which cause image unevenness, are also suppressed.

However, in a case where the toner particles are allowed to contain an excessive amount of the alkali metal and the alkaline earth metal such that the total Net intensity $N_A$ of the alkali metal and the alkaline earth metal is more than 4.00 kcps, the toner particles are aggregated so that coarse toner particles are generated. Therefore, the particle size distribution of the toner is widened, the charge distribution per particle unit is also widened, and toner scattering occurs.

As described above, the toner according to the present exemplary embodiment is assumed to suppress image unevenness that occurs in a case where a high-density image is repeatedly formed in a low-temperature and low-humidity environment.

Hereinafter, the toner according to the present exemplary embodiment will be described in detail.

The toner according to the present exemplary embodiment contains toner particles. The toner may contain an external additive that is externally added to the toner particles.

Toner Particles

Net intensity of each element measured by fluorescent X-ray analysis in toner particles In the toner particles, the total Net intensity $N_A$ of the alkali metal and the alkaline earth metal is 1.50 kcps or more and 4.00 kcps or less, and from the viewpoint of suppressing image unevenness, the total Net intensity $N_A$ thereof is, for example, preferably 2.00 kcps or more and 3.50 kcps or less and more preferably 1.50 kcps or more and 3.00 kcps or less.

In the toner particles, the Net intensity $N_{Cl}$ of Cl is, for example, preferably 0.05 kcps or more and 1.00 kcps or less, more preferably 0.10 kcps or more and 0.80 kcps or less, and still more preferably 0.20 kcps or more and 0.70 kcps or less.

Cl has an effect of increasing the dispersibility of the alkali metal and the alkaline earth metal in the toner particles. Therefore, in a case where the toner particles are allowed to contain Cl such that the Net intensity $N_{Cl}$ of Cl is in the above-described range, the alkali metal and the alkaline earth metal are likely to be present in the toner particles in a nearly uniform state, and the image unevenness is further suppressed.

In the toner particles, the ratio ($N_A/N_{Cl}$) of the total Net intensity $N_A$ of the alkali metal and the alkaline earth metal to the Net intensity $N_{Cl}$ of Cl is, for example, preferably 3 or more and 50 or less, more preferably 4 or more and 30 or less, and still more preferably 5 or more and 20 or less.

In a case where $N_A/N_{Cl}$ is set to be in the above-described range, the effect of increasing the dispersibility of the alkali metal and the alkaline earth metal, exhibited by Cl, is strengthened, and the image unevenness is further suppressed.

Here, from the viewpoint of suppressing the image unevenness, the alkali metal and the alkaline earth metal contains, for example, preferably at least one selected from the group consisting of Na, Mg, and Ca and more preferably at least one selected from the group consisting of Na and Ca.

The Net intensity $N_N$ of Na is, for example, preferably 0.10 kcps or more and 0.35 kcps or less.

The Net intensity $N_M$ of Mg is, for example, preferably 0.15 kcps or more and 0.40 kcps or less.

The Net intensity $N_{ca}$ of Ca is, for example, preferably 1.20 kcps or more and 2.50 kcps or less.

The ratio "$N_N/N_{Cl}$" is, for example, preferably 0.2 kcps or more and 25.0 kcps or less.

The ratio "$N_M/N_{Cl}$" is, for example, preferably 0.2 kcps or more and 7.0 kcps or less.

The ratio "$N_{ca}/N_{Cl}$" is, for example, preferably 4.0 kcps or more and 30.0 kcps or less.

Further, an example of a supply source of each element that allows the Net intensity of each element in the toner particles to be in the above-described range is as follows.

Examples of the supply source of the alkali metal include an additive containing an alkali metal (such as a surfactant or an aggregating agent). Specific examples of the additive containing an alkali metal include an alkali metal salt.

Examples of the alkali metal salt include a lithium salt such as lithium chloride, lithium sulfate, or lithium nitrate; a sodium salt such as sodium chloride, sodium sulfate, or sodium nitrate; a potassium salt such as potassium chloride, potassium sulfate, or potassium nitrate; a rubidium salt such as rubidium chloride, rubidium sulfate, or rubidium nitrate; a cesium salt such as cesium chloride, cesium sulfate, or cesium nitrate; and a francium salt such as francium chloride, francium sulfate, or francium nitrate.

Examples of the alkali metal salt include a sulfonic acid alkali metal salt (for example, sodium alkylbenzenesulfonate such as sodium dodecylbenzene sulfonate).

Examples of the supply source of the alkaline earth element include an additive containing an alkaline earth element (such as a surfactant or an aggregating agent). Specific examples of the additive containing an alkaline earth metal include an alkaline earth metal salt. Examples of alkaline earth metal salt include a beryllium salt such as beryllium chloride, beryllium sulfate, or beryllium nitrate; a magnesium salt such as magnesium chloride, magnesium sulfate, or magnesium nitrate; a calcium salt such as calcium chloride, calcium sulfate, or calcium nitrate; a strontium salt such as strontium chloride, strontium sulfate, or strontium nitrate; a barium salt such as barium chloride, barium sulfate, or barium nitrate; and a radium salt such as radium chloride, radium sulfate, or radium nitrate.

Examples of the alkali metal salt include a sulfonic acid alkaline earth metal salt (for example, calcium alkylbenzene sulfonate such as calcium dodecylbenzene sulfonate) and a sulfide metal salt (such as calcium polysulfide).

Examples of the supply source of chlorine include an additive containing chlorine (such as an aggregating agent). Specific examples of the additive containing chlorine include a chloride. Examples of the chloride include ammonium chloride, aluminum chloride, polyaluminum chloride, iron (II) chloride, zinc chloride, alkali metal chloride (such as lithium chloride, sodium chloride, potassium chloride, rubidium chloride, cesium chloride, or francium chloride), and alkaline earth metal chloride (such as beryllium chloride, magnesium chloride, strontium chloride, barium chloride, or radium chloride).

Further, the range of the Net intensity of each element is adjusted by adjusting the addition amount of the supply source of each element.

A method of measuring the Net intensity of each element is as follows.

Approximately 5 g of toner particles (toner particles to which an external additive is externally added in a case where an external additive is externally added to the toner particles) are compressed by a load of 10 t and pressurization for 60 seconds using a compression molding machine to prepare a disc having a diameter of 50 mm and a thickness of 2 mm. The Net intensity (unit: kilo counts per second, kcps) of each of the Na element and the Cl element is acquired, using this disc as a sample, by performing qualitative and quantitative element analysis with a scanning fluorescent X-ray analyzer (ZSX PrimusII, manufactured by Rigaku Corporation) under the following conditions.

Tube voltage: 40 kV
Tube current: 75 mA
Anticathode: rhodium
Measurement time: 10 minutes
Analytical diameter: diameter of 10 mm Configuration of Toner Particles The toner particles contain, for example, a binder resin, and a colorant, a release agent, and other additives as necessary.

Binder Resin

Examples of the binder resin include vinyl-based resins consisting of homopolymers of monomers such as styrenes (for example, styrene, parachlorostyrene, and α-methylstyrene), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (for example, acrylonitrile and methacronitrile), vinyl ethers (for example, vinyl methyl ether and vinyl isobutyl ether), vinyl ketones (for example, vinyl methyl ketone, vinyl ethyl ketone, and vinyl isopropenyl ketone), and olefins (for example, ethylene, propylene, and butadiene) or copolymers obtained by combining two or more kinds of these monomers.

Other examples of the binder resin include non-vinyl resins such as an epoxy resin, a polyester resin, a polyurethane resin, a polyamide resin, a cellulose resin, a polyether resin, and modified rosin, mixtures of these resins with the above-described vinyl resins, and graft polymers obtained by polymerizing vinyl-based monomers in the coexistence of these resins.

These binder resins may be used alone or in combination of two or more kinds thereof.

In particular, as the binder resin, it is preferable to use, for example, an amorphous resin and a crystalline resin and more preferable to use an amorphous polyester resin and a crystalline polyester resin.

Here, the amorphous resin is a resin that shows only a stepwise endothermic change without having a clear endothermic peak in the thermal analysis measurement using differential scanning calorimetry (DSC), and is a solid at room temperature and thermoplasticized at a temperature higher than or equal to the glass transition temperature.

In addition, the crystalline resin indicates a resin having a clear endothermic peak without showing a stepwise change in endothermic amount in differential scanning calorimetry (DSC).

Specifically, for example, the crystalline resin means that the half-width of the endothermic peak which is measured at a temperature rising rate of 10° C./min is 10° C. or lower, and the amorphous resin means a resin having a half-width of higher than 10° C. or a resin in which a clear endothermic peak is not observed.

The amorphous resin will be described.

Examples of the amorphous resin include known amorphous resins such as an amorphous polyester resin, an amorphous vinyl resin (such as a styrene acrylic resin), an epoxy resin, a polycarbonate resin, and a polyurethane resin. Among these, for example, an amorphous polyester resin or an amorphous vinyl resin (particularly a styrene acrylic resin) is preferable, and an amorphous polyester resin is more preferable.

Further, for example, a combination of an amorphous polyester resin and a styrene acrylic resin is also a preferable aspect of the amorphous resin. Further, for example, application of an amorphous resin having an amorphous polyester resin segment and a styrene acrylic resin segment is also a preferable aspect of the amorphous resin.

Amorphous Polyester Resin

Examples of the amorphous polyester resin include a condensed polymer of a polyvalent carboxylic acid and a polyhydric alcohol. As the amorphous polyester resin, a commercially available product or a synthesized product may be used.

Examples of the polyvalent carboxylic acid include an aliphatic dicarboxylic acid (for example, oxalic acid, malonic acid, maleic acid, fumaric acid, citraconic acid, itaconic acid, glutaconic acid, succinic acid, alkenyl succinic acid, adipic acid, or sebacic acid), an alicyclic dicarboxylic acid (for example, cyclohexanedicarboxylic acid), an aromatic dicarboxylic acid (for example, terephthalic acid, isophthalic acid, phthalic acid, or naphthalenedicarboxylic acid), an anhydride thereof, and lower (for example, having 1 or more and 5 or less carbon atoms) alkyl ester thereof. Among these, for example, an aromatic dicarboxylic acid is preferable as the polyvalent carboxylic acid.

As the polyvalent carboxylic acid, a combination of a dicarboxylic acid with a trivalent or higher valent carboxylic acid having a crosslinked structure or a branched structure may be used. Examples of the trivalent or higher valent carboxylic acid include trimellitic acid, pyromellitic acid, an anhydride thereof, and lower (for example, having 1 or more and 5 or less carbon atoms) alkyl ester thereof.

The polyvalent carboxylic acid may be used alone or in combination of two or more kinds thereof.

Examples of the polyhydric alcohol include an aliphatic diol (such as ethylene glycol, diethylene glycol, triethylene glycol, propylene glycol, butanediol, hexanediol, or neopentyl glycol), an alicyclic diol (such as cyclohexanediol, cyclohexanedimethanol, or hydrogenated bisphenol A) and an aromatic diol (such as an ethylene oxide adduct of bisphenol A or a propylene oxide adduct of bisphenol A). Among these, as the polyhydric alcohol, for example, an aromatic diol or an alicyclic diol is preferable, and an aromatic diol is more preferable.

As the polyhydric alcohol, a combination of a diol with a trihydric or higher polyhydric alcohol having a crosslinked structure or a branched structure may be used. Examples of the trihydric or higher polyhydric alcohol include glycerin, trimethylolpropane, and pentaerythritol.

The polyhydric alcohol may be used alone or in combination of two or more kinds thereof.

The amorphous polyester resin is obtained by a known production method. Specifically, for example, the amorphous polyester resin is obtained by a method of setting the polymerization temperature to 180° C. or higher and 230° C. or lower, reducing the pressure inside the reaction system as necessary, and carrying out the reaction while removing water and alcohol generated during condensation. In a case where the raw material monomer is not dissolved or compatible at the reaction temperature, a solvent having a high boiling point may be added as a dissolution assistant to dissolve the monomer. In this case, the polycondensation reaction is carried out while the dissolution assistant is distilled off. In a case where a monomer with poor compatibility is present in the copolymerization reaction, for example, the monomer with poor compatibility may be condensed with an acid or an alcohol to be polycondensed with the monomer in advance, and then polycondensed with the main component.

Examples of the amorphous polyester resin include a modified amorphous polyester resin in addition to an unmodified amorphous polyester resin. The modified amorphous polyester resin is an amorphous polyester resin in which a bonding group other than an ester bond is present, or an amorphous polyester resin in which a resin component different from polyester is bonded by a covalent bond or an ionic bond. Examples of the modified amorphous polyester resin include a resin having a terminal modified by reacting an amorphous polyester resin obtained by introducing a functional group such as an isocyanate group to the terminal with an active hydrogen compound.

The proportion of the amorphous polyester resin in all the binder resins is, for example, preferably 60% by mass or more and 98% by mass or less, more preferably 65% by mass or more and 95% by mass or less, and still more preferably 70% by mass or more and 90% by mass or less.

Styrene Acrylic Resin

The styrene-acrylic resin is a copolymer obtained by copolymerizing at least a styrene-based monomer (a monomer having a styrene skeleton) and a (meth)acrylic monomer (a monomer containing a (meth)acrylic group and, for example, preferably a monomer containing a (meth)acryloxy group). The styrene acrylic resin includes, for example, a copolymer of a monomer of styrenes and a monomer of (meth)acrylic acid esters.

Further, the acrylic resin portion in the styrene acrylic resin has a partial structure obtained by polymerizing any one or both of an acrylic monomer and a methacrylic monomer. Further, "(meth)acryl" is an expression including both "acryl" and "methacryl".

Examples of the styrene-based monomer include styrene, α-methylstyrene, meta-chlorostyrene, para-chlorostyrene, para-fluorostyrene, para-methoxystyrene, meta-tert-butoxystyrene, para-tert-butoxystyrene, para-vinylbenzoic acid, and para-methyl-α-methylstyrene. The styrene-based monomer may be used alone or in combination of two or more kinds thereof.

Examples of the (meth)acrylic monomer include (meth) acrylic acid, methyl (meth)acrylate, ethyl (meth)acrylate, n-propyl (meth)acrylate, isopropyl (meth)acrylate, n-butyl (meth)acrylate, isobutyl (meth)acrylate, n-hexyl (meth)acrylate, 2-ethylhexyl (meth)acrylate, lauryl (meth)acrylate, stearyl (meth)acrylate, cyclohexyl (meth)acrylate, dicyclopentanyl (meth)acrylate, isobornyl (meth)acrylate, 2-hydroxyethyl (meth)acrylate, hydroxypropyl (meth)acrylate, and 4-hydroxybutyl (meth)acrylate. The (meth)acrylic monomer may be used alone or in combination of two or more kinds thereof.

The polymerization ratio of the styrene-based monomer to the (meth)acrylic monomer (styrene-based monomer:(meth) acrylic monomer) is, for example, preferably in a range of 70:30 to 95:5 on a mass basis.

The styrene acrylic resin may have a crosslinked structure. The styrene acrylic resin having a crosslinked structure can be produced by, for example, copolymerizing a styrene-based monomer, a (meth)acrylic monomer, and a crosslinkable monomer. The crosslinkable monomer is not particularly limited, but for example, a bifunctional or higher functional (meth)acrylate compound is preferable.

A method of preparing the styrene acrylic resin is not particularly limited, and for example, solution polymerization, precipitation polymerization, suspension polymerization, bulk polymerization, or emulsion polymerization is applied. A known operation (for example, a batch type, semi-continuous type, or continuous type operation) is applied to the polymerization reaction.

The proportion of the styrene acrylic resin in all the binder resins is, for example, preferably 0% by mass or more and 20% by mass or less, more preferably 1% by mass or more and 15% by mass or less, and still more preferably 2% by mass or more and 10% by mass or less.

Amorphous resin having amorphous polyester resin segment and styrene acrylic resin segment (hereinafter, also referred to as "hybrid amorphous resin")

The hybrid amorphous resin is an amorphous resin in which an amorphous polyester resin segment and a styrene acrylic resin segment are chemically bonded to each other.

Examples of the hybrid amorphous resin include a resin having a main chain consisting of a polyester resin and a side chain consisting of a styrene acrylic resin chemically bonded to the main chain; a resin having a main chain consisting of a styrene acrylic resin and a side chain consisting of a polyester resin chemically bonded to the main chain; a resin having a main chain to which a polyester resin and a styrene acrylic resin are chemically bonded; and a resin having a main chain to which a polyester resin and a styrene acrylic resin are chemically bonded and at least one of a side chain consisting of a polyester resin chemically bonded to the main chain or a side chain consisting of a styrene acrylic resin chemically bonded to the main chain.

The amorphous polyester resin segment and the styrene acrylic resin segment are as described above, and the description thereof will not be provided.

The ratio of the total amount of the polyester resin segment and the styrene acrylic resin segment in the entire hybrid amorphous resin is, for example, preferably 80% by mass or more, more preferably 90% by mass or more, still more preferably 95% by mass or more, and even still more preferably 100% by mass.

In the hybrid amorphous resin, the proportion of the styrene acrylic resin segment in the total amount of the polyester resin segment and the styrene acrylic resin segment is, for example, preferably 20% by mass or more and 60% by mass or less, more preferably 25% by mass or more and 55% by mass or less, and still more preferably 30% by mass or more and 50% by mass or less.

It is preferable that the hybrid amorphous resin is produced by, for example, any of the following methods (i) to (iii).

(I) A polyester resin segment is prepared by polycondensation of a polyhydric alcohol and a polyvalent carboxylic acid, and the monomer constituting the styrene acrylic resin segment is addition-polymerized.

(ii) A styrene acrylic resin segment is prepared by addition polymerization of an addition-polymerizable monomer, and the polyhydric alcohol and the polyvalent carboxylic acid are polycondensed.

(Iii) The polycondensation of the polyhydric alcohol and the polyvalent carboxylic acid and the addition polymerization of the addition-polymerizable monomer are performed in parallel.

The proportion of the hybrid amorphous resin in all the binder resins is, for example, preferably 60% by mass or more and 98% by mass or less, more preferably 65% by mass or more and 95% by mass or less, and still more preferably 70% by mass or more and 90% by mass or less.

The characteristics of the amorphous resin will be described.

The glass transition temperature (Tg) of the amorphous resin is, for example, preferably 50° C. or higher and 80° C. or lower and more preferably 50° C. or higher and 65° C. or lower.

Further, the glass transition temperature is acquired from the DSC curve obtained by differential scanning calorimetry (DSC) and more specifically acquired by the "extrapolated glass transition start temperature" described in the method of acquiring the glass transition temperature in JIS K 7121-1987 "Method of measuring transition temperature of plastics".

The weight-average molecular weight (Mw) of the amorphous resin is, for example, preferably 5000 or more and 1000000 or less and more preferably 7000 or more and 500000 or less.

The number average molecular weight (Mn) of the amorphous resin is, for example, preferably 2000 or more and 100000 or less.

The molecular weight distribution Mw/Mn of the amorphous resin is, for example, preferably 1.5 or more and 100 or less and more preferably 2 or more and 60 or less.

Further, the weight-average molecular weight and the number average molecular weight are measured by gel permeation chromatography (GPC). The molecular weight is measured by GPC using GPC/HLC-8120 GPC (manufactured by Tosoh Corporation) as a measuring device, TSKgel SuperHM-M (15 cm) (manufactured by Tosoh Corporation) as a column, and a THF solvent. The weight-average molecular weight and the number average molecular weight are calculated using a molecular weight calibration curve created by a monodisperse polystyrene standard sample based on the measurement results.

The crystalline resin will be described.

Examples of the crystalline resin include known crystalline resins such as a crystalline polyester resin and a crystalline vinyl resin (for example, a polyalkylene resin or a long-chain alkyl (meth)acrylate resin). Among these, for example, a crystalline polyester resin is preferable from the viewpoints of the mechanical strength and the low-temperature fixability of the toner.

Crystalline Polyester Resin

Examples of the crystalline polyester resin include a polycondensate of a polyvalent carboxylic acid and a polyhydric alcohol. As the crystalline polyester resin, a commercially available product or a synthesized product may be used.

Since the crystalline polyester resin easily forms a crystal structure, for example, a polycondensate obtained by using a linear aliphatic polymerizable monomer is preferable to a polymerizable monomer having an aromatic ring.

Examples of the polyvalent carboxylic acid include an aliphatic dicarboxylic acid (for example, oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, or 1,18-octadecanedicarboxylic acid), an aromatic dicarboxylic acid (for example, a dibasic acid such as phthalic acid, isophthalic acid, terephthalic acid, or naphthalene-2,6-dicarboxylic acid), an anhydride thereof, and lower (for example, having 1 or more and 5 or less carbon atoms) alkyl ester thereof.

As the polyvalent carboxylic acid, a combination of a dicarboxylic acid with a trivalent or higher valent carboxylic acid having a crosslinked structure or a branched structure may be used. Examples of the trivalent carboxylic acid include an aromatic carboxylic acid (for example, 1,2,3-benzenetricarboxylic acid, 1,2,4-benzenetricarboxylic acid, or 1,2,4-naphthalenetricarboxylic acid), an anhydride thereof, and lower (for example, having 1 or more and 5 or less carbon atoms) alkyl ester thereof.

As the polyvalent carboxylic acid, a combination of these dicarboxylic acids with a dicarboxylic acid containing a sulfonic acid group and a dicarboxylic acid having an ethylenic double bond may be used.

The polyvalent carboxylic acid may be used alone or in combination of two or more kinds thereof.

Examples of the polyhydric alcohol include an aliphatic diol (for example, a linear aliphatic diol having a main chain portion with 7 or more and 20 or less carbon atoms). Examples of the aliphatic diol include ethylene glycol, 1,3-propanediol, 1,4-butanediol, 1,5-pentanedial, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Among these, for example, 1,8-octanediol, 1,9-nonanediol, or 1,10-decanediol is preferable as the aliphatic diol.

As the polyhydric alcohol, a combination of a diol with a trihydric or higher polyhydric alcohol having a crosslinked structure or a branched structure may be used. Examples of the trihydric or higher polyhydric alcohol include glycerin, trimethylolethane, trimethylolpropane, and pentaerythritol.

The polyhydric alcohol may be used alone or in combination of two or more kinds thereof.

As the polyhydric alcohol, the content of the aliphatic diol may be 80% by mole or more and, for example, preferably 90% by mole or more.

The crystalline polyester resin can be obtained by, for example, a known production method similar to the amorphous polyester resin.

As the crystalline polyester resin, for example, a polymer of α,ω-linear aliphatic dicarboxylic acid and α,ω-linear aliphatic diol is preferable.

As the α,ω-linear aliphatic dicarboxylic acid, for example, α,ω-linear aliphatic dicarboxylic acid in which the number of carbon atoms of an alkylene group connecting two carboxy groups is 3 or more and 14 or less is preferable, the number of carbon atoms of the alkylene group is more preferably 4 or more and 12 or less, and the number of carbon atoms of the alkylene group is still more preferably 6 or more and 10 or less.

Examples of the α,ω-linear aliphatic dicarboxylic acid include succinic acid, glutaric acid, adipic acid, 1,6-hexanedicarboxylic acid (common name, suberic acid), 1,7-heptanedicarboxylic acid (common name, azelaic acid), 1,8-octanedicarboxylic acid (common name, sebacic acid), 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid. Among these, for example, 1,6-hexanedicarboxylic acid, 1,7-heptanedicarboxylic acid, 1,8-octanedicarboxylic acid, 1,9-nonanedicarboxylic acid, or 1,10-decanedicarboxylic acid is preferable.

The α,ω-linear aliphatic dicarboxylic acid may be used alone or in combination of two or more kinds thereof.

As the α,ω-linear aliphatic diol, for example, α,ω-linear aliphatic diol in which the number of carbon atoms of an alkylene group connecting two hydroxy groups is 3 or more and 14 or less is preferable, the number of carbon atoms of the alkylene group is more preferably 4 or more and 12 or less, and the number of carbon atoms of the alkylene group is still more preferably 6 or more and 10 or less.

Examples of the α,ω-linear aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 1,14-tetradecanediol, and 1,18-octadecanediol. Among these, for example, 1,6-hexanediol, 1,7-heptanediol, 1,8-octanediol, 1,9-nonanediol, or 1,10-decanediol is preferable.

The α,ω-linear aliphatic diol may be used alone or in combination of two or more kinds thereof.

As the polymer of the α,ω-linear aliphatic dicarboxylic acid and the α,ω-linear aliphatic diol, for example, a polymer of at least one selected from the group consisting of 1,6-hexanedicarboxylic acid, 1,7-heptanedicarboxylic acid, 1,8-octanedicarboxylic acid, 1,9-nonanedicarboxylic acid, and 1,10-decanedicarboxylic acid and at least one selected from the group consisting of 1,6-hexanediol, 1,7-heptanediol, 1,8-octanediol, 1,9-nonanediol, and 1,10-decanediol is preferable. Among these, for example, a polymer of 1,10-decanedicarboxylic acid and 1,6-hexanediol is more preferable.

The proportion of the crystalline polyester resin in all the binder resins is, for example, preferably 1% by mass or more and 20% by mass or less, more preferably 2% by mass or more and 15% by mass or less, and still more preferably 3% by mass or more and 10% by mass or less.

The characteristics of the crystalline resin will be described.

The melting temperature of the crystalline resin is, for example, preferably 50° C. or higher and 100° C. or lower, more preferably 55° C. or higher and 90° C. or lower, and still more preferably 60° C. or higher and 85° C. or lower.

Further, the melting temperature is acquired from the DSC curve obtained by differential scanning calorimetry (DSC) according to the "melting peak temperature" described in the method of acquiring the melting temperature in JIS K7121-1987 "Method of measuring transition temperature of plastics".

The weight-average molecular weight (Mw) of the crystalline resin is, for example, preferably 6000 or more and 35000 or less.

The content of the binder resin is, for example, preferably 40% by mass or more and 95% by mass or less, more preferably 50% by mass or more and 90% by mass or less, and still more preferably 60% by mass or more and 85% by mass or less with respect to the entirety of the toner particles.

Colorant

As the colorant, a pigment having an isoindoline skeleton is applied.

Examples of the pigment having an isoindoline skeleton include C. I. Pigment Yellow 185 and Pigment Yellow 139.

Among these, from the viewpoints of color reproducibility and color development, for example, C. I. Pigment Yellow 185 is preferable as the pigment having an isoindoline skeleton. Here, the structural formula of C. I. Pigment Yellow 185 is shown below. In addition, "C. I." is an abbreviation for "Color Index".

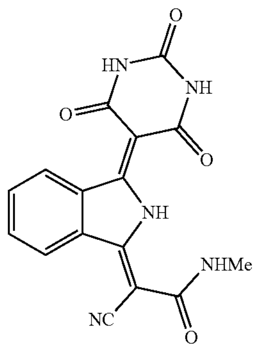 [SMILES: CNC(=O)/C(C#N)=c1\[nH]c(=C2C(=O)NC(=O)NC2=O)c2ccccc12]

As the colorant, a combination of the pigment having an isoindoline skeleton and colorants other than the pigment may be used. Here, the proportion of the pigment having an isoindoline skeleton in all the colorants may be, for example, 50% by mass or more and 100% by mass or less (preferably 70% by mass or more and 100% by mass or less).

Examples of other colorants include pigments such as Carbon Black, Chrome Yellow, Hansa Yellow, Benzidine Yellow, Suren Yellow, Quinoline Yellow, Pigment Yellow, Permanent Orange GTR, Pyrazolone Orange, Vulcan Orange, Watching Red, Permanent Red, Brilliant Carmine 3B, Brilliant Carmine 6B, Dupont Oil Red, Pyrazolon Red, Lithol Red, Rhodamin B Lake, Lake Red C, Pigment Red, Rose Bengal, Aniline Blue, Ultramarine Blue, Calco Oil Blue, Methylene Blue Chloride, Phthalocyanine Blue, Pigment Blue, Phthalocyanine Green, and Malachite Green Oxalate; and dyes such as an acridine-based dye, a xanthene-based dye, an azo-based dye, a benzoquinone-based dye, an azine-based dye, an anthraquinone-based dye, a thioindigo-based dye, a dioxazine-based dye, a thiazine-based dye, an azomethine-based dye, an indigo-based dye, a phthalocyanine-based dye, an aniline black-based dye, a polymethine-based dye, a triphenylmethane-based dye, a diphenylmethane-based dye, and a thiazole-based dye. These colorants may be used alone or in combination of two or more kinds thereof.

As the colorant, a surface-treated colorant may be used as necessary, or a combination with a dispersant may be used. Further, a plurality of kinds of colorants may be used in combination.

The content of the colorant is, for example, preferably 1% by mass or more and 30% by mass or less and more preferably 3% by mass or more and 15% by mass or less with respect to the entirety of the toner particles.

Release Agent

Examples of the release agent include hydrocarbon-based wax; natural wax such as carnauba wax, rice wax, or candelilla wax; synthetic or mineral/petroleum wax such as montan wax; and ester-based wax such as fatty acid ester or montanic acid ester. The release agent is not limited thereto.

From the viewpoint that the release agent is finely dispersed during the production of toner particles and thus the dispersibility of the pigment having an isoindoline skeleton is increased, for example, ester wax is preferable as the release agent.

Particularly in a case where ester wax is applied as the release agent, the release agent is present in the toner particles in a spherical shape and in a finely dispersed state, and thus the inside of the toner particles is hardened due to the filler effect and the surface exposure of the pigment is further suppressed. As a result, image unevenness is more likely to be suppressed.

Examples of the ester wax include an ester compound of a higher fatty acid having 10 or more carbon atoms and a monohydric or polyhydric alcohol, which has a melting temperature of 60° C. or higher and 110° C. or lower (for example, preferably 65° C. or higher and 100° C. or lower and more preferably 70° C. or higher and 95° C. or lower).

As the ester wax, for example, an ester compound of a higher fatty acid having 10 or more and 25 or less carbon atoms and a monohydric or polyhydric alcohol (for example, preferably a monohydric or polyhydric aliphatic alcohol having 8 or more carbon atoms) is preferable, and an ester compound of a higher fatty acid having 16 or more and 21 or less carbon atoms and a monohydric or polyhydric alcohol (for example, preferably a monohydric or polyhydric aliphatic alcohol having 8 or more carbon atoms) is more preferable.

Examples of the ester wax include an ester compound of a higher fatty acid (capric acid, lauric acid, myristic acid, palmitic acid, stearic acid, arachidic acid, behenic acid, or oleic acid) and an alcohol (a monohydric alcohol such as methanol, ethanol, propanol, isopropanol, butanol, capryl alcohol, lauryl alcohol, myristyl alcohol, cetyl alcohol, stearyl alcohol, or oleyl alcohols; or a polyhydric alcohol such as glycerin, ethylene glycol, propylene glycol, sorbitol, or pentaerythritol), and specific examples thereof include carnauba wax, rice wax, candelilla wax, jojoba oil, wood wax, beeswax, insect wax, lanolin, and montanic acid ester wax.

The melting temperature of the release agent is, for example, preferably 50° C. or higher and 110° C. or lower and more preferably 60° C. or higher and 100° C. or lower.

The melting temperature of the release agent is acquired from the DSC curve obtained by differential scanning calorimetry (DSC) according to the "melting peak temperature" described in the method of acquiring the melting temperature in JIS K7121:1987 "Method of measuring transition temperature of plastics".

The content of the release agent is, for example, preferably 1% by mass or more and 20% by mass or less and more preferably 5% by mass or more and 15% by mass or less with respect to the entirety of the toner particles.

Other Additives

Examples of other additives include known additives such as a magnetic material, a charge control agent, and inorganic powder. These additives are contained in the toner particles as internal additives.

Characteristics of Toner Particles

The toner particles may be toner particles having a single layer structure or toner particles having a so-called core-shell structure formed of a core portion (core particle) and a coating layer (shell layer) covering the core portion.

The toner particles having a core-shell structure may be formed of, for example, a core portion containing a binder resin and, as necessary, other additives such as a colorant and a release agent, and a coating layer containing a binder resin.

The volume average particle diameter (D50v) of the toner particles is, for example, preferably 2 μm or more and 10 μm or less and more preferably 4 μm or more and 8 μm or less.

Various average particle diameters and various particle size distribution indices of the toner particles are measured using Coulter Multisizer II (manufactured by Beckman Coulter Inc.) and ISOTON-II (manufactured by Beckman Coulter Inc.) as an electrolytic solution.

During the measurement, 0.5 mg or more and 50 mg or less of a measurement sample is added to 2 ml of a 5 mass % aqueous solution of a surfactant (for example, preferably sodium alkylbenzene sulfonate) as a dispersant. The solution is added to 100 ml or more and 150 ml or less of the electrolytic solution.

The electrolytic solution in which the sample is suspended is subjected to a dispersion treatment for 1 minute with an ultrasonic disperser, and the particle size distribution of particles having a particle diameter in the range of 2 μm or more and 60 μm or less is measured by a Coulter Multisizer II using an aperture with an aperture diameter of 100 μm. The number of particles to be sampled is 50000.

Cumulative distribution of the volume and the number is drawn from the small diameter side for each particle size range (channel) divided based on the particle size distribution to be measured, and the particle diameter at a cumulative 16% is defined as the volume particle diameter D16v and the number particle diameter D16p, the particle diameter at a cumulative 50% is defined as the volume average particle diameter D50v and the cumulative number average particle diameter D50p, and the particle diameter at a cumulative 84% is defined as the volume particle diameter D84v and the number particle diameter D84p.

Based on the description above, the volume particle size distribution index (GSDv) is calculated as $(D84v/D16v)^{1/2}$, and the number particle size distribution index (GSDp) is calculated as $(D84p/D16p)^{1/2}$.

The average circularity of the toner particles is, for example, preferably 0.94 or more and 1.00 or less and more preferably 0.95 or more and 0.98 or less.

The average circularity of the toner particles is acquired by (perimeter equivalent to circle)/(perimeter) [(perimeter of circle having same projected area as particle image)/(perimeter of projected particle image)]. Specifically, the average circularity is a value measured by the following method.

The average circularity is acquired by a flow type particle image analyzer (FPIA-3000, manufactured by Sysmex Corporation) that sucks and collects toner particles to be measured, forms a flat flow, instantly emits strobe light so that a particle image is captured as a still image, and analyzes the particle image. The number of samples in a case of calculating the average circularity is set to 3500.

In a case where the toner has an external additive, the toner (developer) to be measured is dispersed in water containing a surfactant, and an ultrasonic treatment is performed, thereby obtaining toner particles from which the external additive has been removed.

As the toner particles, for example, any of the following first toner particles and second toner particles are preferable.

First Toner Particles

In a case where a cross section of the toner particle is observed, at least two domains of crystalline resins satisfy Condition (A), Condition (B1), Condition (C), and Condition (D).

Condition (A): An aspect ratio of the domain of the crystalline resin is 5 or more and 40 or less.

Condition (B1): A major axis length of the domain of the crystalline resin is 0.5 μm or more and 1.5 μm or less.

Condition (C): An angle between an extension line of the major axis of the domain of the crystalline resin and a tangent line at a contact point where the extension line is in contact with the surface of the toner particles is 60 degrees or more and 90 degrees or less.

Condition (D): A crossing angle between extension lines of the major axes in two domains of the crystalline resins is 45 degrees or more and 90 degrees or less.

Second Toner Particles

In a case where a cross section of the toner particle is observed, at least two domains of crystalline resins satisfy Condition (A), Condition (B2), Condition (C), and Condition (D).

Condition (A): An aspect ratio of the domain of the crystalline resin is 5 or more and 40 or less.

Condition (B2): A ratio of a major axis length of the domain of the crystalline resin to a maximum diameter of the toner particle in at least one of the two domains of the crystalline resins is 10% or more and 30% or less.

Condition (C): An angle between an extension line of the major axis of the domain of the crystalline resin and a tangent line at a contact point where the extension line is in contact with the surface of the toner particles is 60 degrees or more and 90 degrees or less.

Condition (D): A crossing angle between extension lines of the major axes in two domains of the crystalline resins is 45 degrees or more and 90 degrees or less.

The first toner particles may or may not be second toner particles and are, for example, preferably second toner particles.

The second toner particles may or may not be the first toner particles, and are, for example, preferably the first toner particles.

Figure 3:
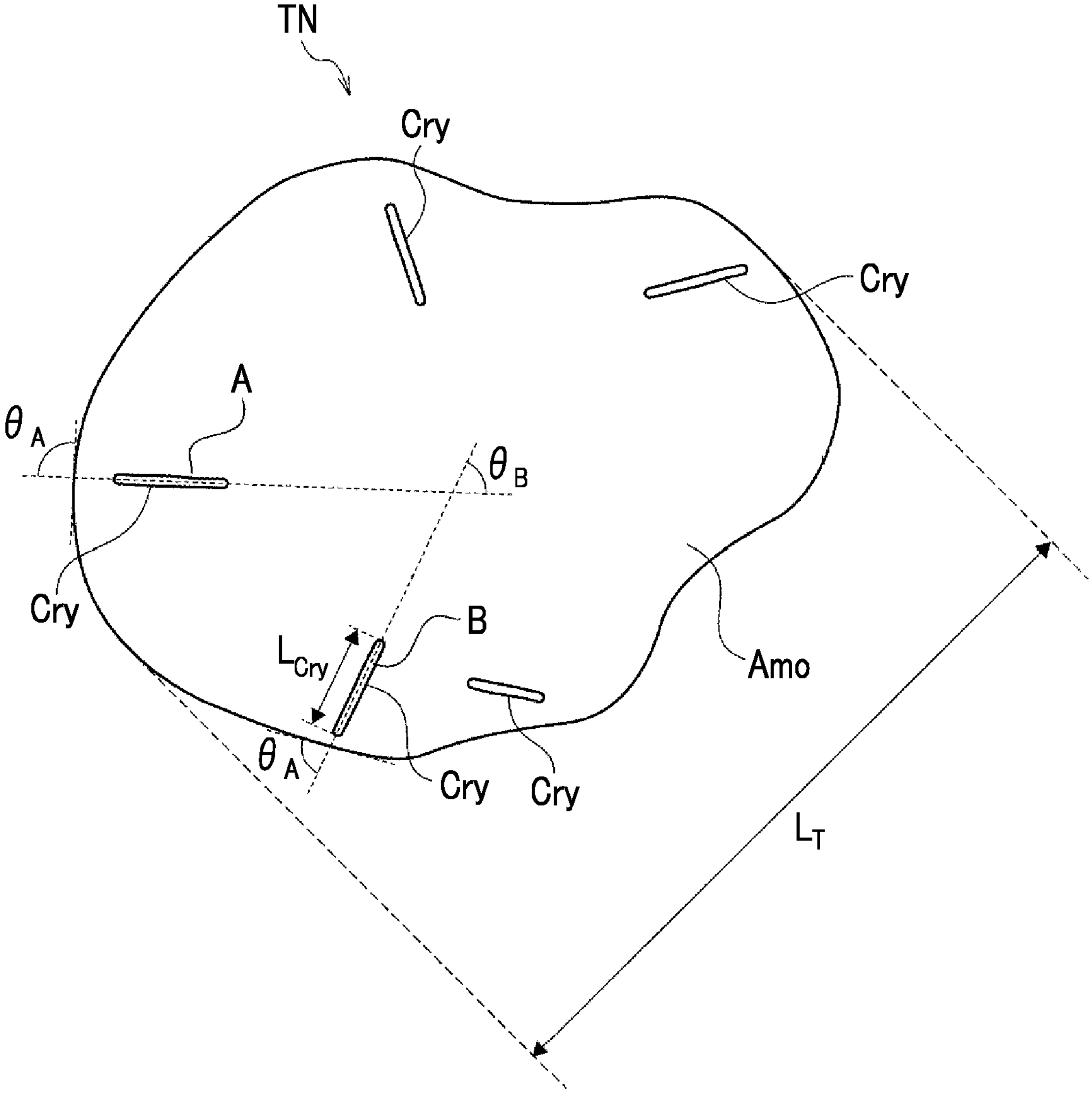
FIG. 3 is a schematic view showing a cross section of a toner particle in an electrostatic charge image developing toner according to the present exemplary embodiment.

FIG. 3 schematically shows a cross section of the toner particle. In each reference numeral in FIG. 3, TN represents the toner particle, Amo represents the amorphous resin, Cry represents the crystalline resin, $L_{cry}$ represents the major axis length of the domain of the crystalline resin, $L_T$ represents the maximum diameter of the toner particle, $\theta_A$ represents the angle between an extension line of the major axis of the domain of the crystalline resin and a tangent line at a contact point where the extension line is in contact with the surface of the toner particle, and $\theta_B$ represents the crossing angle between extension lines of the major axes in two domains of the crystalline resins.

The toner containing the first toner particles or the second toner particles further suppresses the image unevenness that occurs in a case where a high-density image is repeatedly formed in a low-temperature and low-humidity environment. The reason for this is assumed as follows.

In the first toner particles and the second toner particles, at least two domains of elliptical or needle-like crystalline resins having a large aspect ratio and a long major axis length are disposed so as to extend inward from the surface side of the toner particle and intersect with each other (see FIG. 3).

It is assumed that since the pigment having an isoindoline skeleton has a high affinity for the crystalline resin, the pigment is incorporated into the domain of the crystalline resin or the periphery thereof during the production of the toner particles. Therefore, it is assumed that the pigment is dispersed inside the toner particles along the disposition of the domains of the crystalline resins, and the exposure of the pigment to the surface of the toner particles is suppressed. As described above, the toner particles in which the surface exposure of the pigment is suppressed further suppress the image unevenness that occurs in a case where a high-density image is repeatedly formed in a low-temperature and low-humidity environment.

In a case of the first toner particles, at least two domains of crystalline resins (for example, preferably domains of at least three crystalline resins) satisfy Condition (A), Condition (B1), Condition (C), and Condition (D) when a cross section of the toner particle is observed.

From the viewpoint of suppressing the image unevenness, the content of the first toner particles in the entirety of the toner particles is, for example, preferably 40% by number or more, more preferably 70% by number or more, and still more preferably 80% by number or more, and particularly preferably 90% by number or more. The proportion of the first toner particles in the entirety of the toner particles is ideally 100% by number.

In a case of the second toner particles, at least two domains of crystalline resins (for example, preferably at least three domains of crystalline resins) satisfy Condition (A), Condition (B2), Condition (C), and Condition (D) when a cross section of the toner particle is observed.

From the viewpoint of suppressing the image unevenness, the proportion of the second toner particles in the entirety of the toner particles is, for example, preferably 40% by number or more, more preferably 70% by number or more, still more preferably 80% by number or more, and particularly preferably 90% by number or more. The proportion of the second toner particles in the entirety of the toner particles is ideally 100% by number.

Condition (A), Condition (B1), Condition (B2), Condition (C), and Condition (D) each have a preferable range.

Condition (A)

From the viewpoint of suppressing the image unevenness, the aspect ratio of the domain of the crystalline resin is 5 or more and 40 or less and, for example, preferably 10 or more and 40 or less.

The aspect ratio of the domain of the crystalline resin indicates the ratio (major axis length/minor axis length) of the major axis length to the minor axis length in the domain of the crystalline resin. The major axis length of the domain of the crystalline resin indicates the maximum length of the domain of the crystalline resin. The minor axis length of the domain of the crystalline resin indicates the maximum length among lengths in the direction orthogonal to the extension line of the major axis length of the domain of the crystalline resin.

Condition (B1)

From the viewpoint of suppressing the image unevenness, the major axis length ($L_{cry}$ in FIG. 3) of the domain of the crystalline resin is, for example, 0.5 μm or more and 1.5 μm or less and preferably 0.8 μm or more and 1.5 μm or less.

Condition (B2)

From the viewpoint of suppressing the image unevenness, the ratio of the major axis length ($L_{cry}$ in FIG. 3) of the domain of the crystalline resin to the maximum diameter ($L_t$ in FIG. 3) of the toner particle is, for example, 10% or more and 30% or less, preferably 13% or more and 30% or less, and more preferably 17% or more and 30% or less.

The maximum diameter of the toner particle indicates the maximum length (so-called long diameter) of a straight line drawn to connect two arbitrary points on the contour line of the cross section of the toner particle.

Condition (C)

From the viewpoint of suppressing the image unevenness, the angle ($\theta_A$ in FIG. 3) between the extension line of the major axis of the domain of the crystalline resin and the tangent line at a contact point where the extension line is in contact with the surface of the toner particle (that is, the outer edge of the toner particles) is, for example, 60 degrees or more and 90 degrees or less and preferably 75 degrees or more and 90 degrees or less.

Condition (D)

From the viewpoint of suppressing the image unevenness, the crossing angle ($\theta_B$ in FIG. 3) between extension lines of the major axes in two domains of the crystalline resins is, for example, 45 degrees or more and 90 degrees or less and preferably 60 degrees or more and 90 degrees or less.

Method of Observing Cross Section of Toner Particle

The toner particles (or toner particles to which an external additive is attached) are mixed with an epoxy resin so as to be embedded, and the epoxy resin is solidified. The obtained solidified product is cut by an ultramicrotome device (UltracutUCT, manufactured by Leica Corporation) to prepare a thin sample having a thickness of 80 nm or more and 130 nm or less. The thin sample is dyed with ruthenium tetroxide in a desiccator at 30° C. for 3 hours. Further, a STEM observation image (acceleration voltage: 30 kV, magnification: 20000 times) in a transmission image mode of the dyed thin sample is obtained using an ultra-high resolution field emission scanning electron microscope (FE-SEM, S-4800, manufactured by Hitachi High-Tech Corporation). Since the image includes cross sections of toner particles with various sizes, the cross sections of toner particles having a volume average particle diameter of 85% or more are selected and used as an observation target. Here, the diameter of a cross section of the toner particle indicates the maximum length (so-called long diameter) of a straight line drawn to connect two arbitrary points on the contour line of the cross section of the toner particle.

In the image, the amorphous resin, the crystalline resin, and the release agent are distinguished from each other based on the contrast and the shape. By carrying out ruthenium dyeing, the amorphous resin (for example, an amorphous polyester resin) is dyed deepest, the crystalline resin (for example, a crystalline polyester resin) is dyed, and the release agent is dyed lightest. By adjusting the contrast, the amorphous resin is observed to be black, the crystalline resin is observed to be light gray, and the release agent is observed to be white.

The domain of the crystalline resin is image-analyzed to determine whether the toner particles satisfy Condition (A), Condition (B1), Condition (B2), Condition (C), and Condition (D). In a case where the proportion of the first toner particles or the second toner particles is acquired, 100 toner particles are observed, and the number and the proportion of the first toner particles or the second toner particles are calculated.

From the viewpoint of suppressing the image unevenness, it is preferable that the first toner particles and the second toner particles satisfy, for example, Condition (E).

Condition (E): In a case where a cross section of the toner particle is observed, the domain of the release agent is present inside the toner particle at a depth of 50 nm or more from the surface thereof. That is, in a case where a cross section of the toner particle is observed, the shortest distance between the domain of the release agent present in the toner particle and the surface (that is, the outer edge) of the toner particle is 50 nm or more.

Condition (E) indicates that the domain of the release agent is not exposed to the surface of the toner particle. In a case where the domain of the release agent is exposed to the surface of the toner particle, the external additive is unevenly distributed in the exposed portion of the release agent and attached thereto. Further, in a case where the domain of the release agent is present inside the toner particle at a depth of 50 nm or more from the surface thereof, the external additive is attached to the surface of the toner particle in a nearly uniform state. As a result, the image unevenness is suppressed.

Condition (E) is confirmed by the method of observing the cross section of the toner particle described above.

From the viewpoint of suppressing the image unevenness, the proportion of the first toner particles satisfying Condition (E) in the entirety of the toner particles is, for example, preferably 40% by number or more, more preferably 70% by number or more, still more preferably 80% by number or more, particularly preferably 90% by number or more, and ideally preferably 100% by number.

From the viewpoint of suppressing the image unevenness, the proportion of the second toner particles satisfying Condition (E) in the entirety of the toner particles is, for example, preferably 40% by number or more, more preferably 70% by number or more, still more preferably 80% by number or more, particularly preferably 90% by number or more, and ideally preferably 100% by number.

External Additive

Examples of the external additive include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)_n$, $Al_2O_3 \cdot 2SiO_2$, $CaCO_3$, $MgCO_3$, $BaSO_4$, and $MgSO_4$.

The surface of the inorganic particle serving as the external additive may be subjected to, for example, a hydrophobic treatment. The hydrophobic treatment is performed, for example, by immersing the inorganic particles in a hydrophobic treatment agent. The hydrophobic treatment agent is not particularly limited, and examples thereof include a silane-based coupling agent, silicone oil, a titanate-based coupling agent, and an aluminum-based coupling agent. These hydrophobic treatment agents may be used alone or in combination of two or more kinds thereof. The amount of the hydrophobic treatment agent is, for example, typically 1 part by mass or more and 10 parts by mass or less with respect to 100 parts by mass of the inorganic particles.

Examples of external additives also include resin particles (resin particles such as polystyrene, polymethylmethacrylate, and melamine resins), a cleaning activator (for example, a metal salt of a higher fatty acid represented by zinc stearate or fluorine-based polymer particles), and the like.

The amount of the external additive is, for example, preferably 0.01% by mass or more and 5% by mass or less and more preferably 0.01% by mass or more and 2.0% by mass or less with respect to the entirety of the toner particles.

Method of Producing Toner

The toner according to the present exemplary embodiment can be obtained by externally adding the external additive to the toner particles after the production of the toner particles.

The toner particles may be produced by any of a dry production method (for example, a kneading and pulverizing method) or a wet production method (for example, an aggregation and coalescence method, a suspension polymerization method, or a dissolution suspension method). The production method is not particularly limited, and a known production method is employed. Among these, the toner particles may be obtained by, for example, the aggregation and coalescence method.

Specifically, in a case where the toner particles are produced by the aggregation and coalescence method, the toner particles are produced by performing a step of preparing an amorphous resin particle dispersion liquid in which amorphous resin particles are dispersed and a crystalline resin particle dispersion liquid in which crystalline resin particles are dispersed (resin particle dispersion liquid preparation step), a step of allowing the amorphous resin particles (other particles as necessary) to be aggregated in the amorphous resin particle dispersion liquid (in the dispersion liquid after being mixed with another particle dispersion liquid as necessary) to form first aggregated particles (first aggregated particle formation step), a step of mixing an aggregated particle dispersion liquid in which the first aggregated particles are dispersed with the amorphous resin particle dispersion liquid and the crystalline resin particle dispersion liquid (or mixing an aggregated particle dispersion liquid in which the first aggregated particles are dispersed with a mixed solution of the amorphous resin particle dispersion liquid and the crystalline resin particle dispersion liquid) and repeatedly performing an operation of carrying out aggregation two times or more such that the amorphous resin particles and the crystalline resin particles are further attached to the surfaces of the first aggregated particles to form second aggregated particles (second aggregated particle formation step), a step of mixing an aggregated particle dispersion liquid in which the second aggregated particles are dispersed with the amorphous resin particle dispersion liquid and carrying out aggregation such that the amorphous resin particles are attached to the surfaces of the second aggregated particles to form third aggregated particles (third aggregated particle formation step), and a step of heating an aggregated particle dispersion liquid in which the third aggregated particles are dispersed and fusing and coalescing the aggregated particles to form toner particles (fusion and coalescence step).

Here, in order to set the Net intensity of each of element in the toner particles to be in the above-described range, a supply source of each element is added in the process of producing the toner particles.

The details of each step will be described below. In the following description, a method of obtaining toner particles containing a colorant and a release agent will be described, but the colorant and the release agent are used as necessary. It is needless to say that additives other than the colorant and the release agent may be used.

Resin Particle Dispersion Liquid Preparation Step

An amorphous resin particle dispersion liquid in which the amorphous resin particles are dispersed and a crystalline resin particle dispersion liquid in which the crystalline resin particles are dispersed are prepared.

The amorphous resin particle dispersion liquid may also contain a colorant. An amorphous resin particle dispersion liquid in which the amorphous resin particles and colorant particles are dispersed is prepared by allowing the colorant to be dispersed in a case where the amorphous resin is dispersed in a dispersion medium.

The resin particle dispersion liquid is prepared, for example, by allowing the resin particles to be dispersed in a dispersion medium using a surfactant.

Examples of the dispersion medium used in the resin particle dispersion liquid include an aqueous medium. Examples of the aqueous medium include water such as distilled water or ion exchange water and alcohols. The aqueous medium may be used alone or in combination of two or more kinds thereof.

Examples of the surfactant include an anionic surfactant based on a sulfuric acid ester salt, a sulfonate, a phosphoric acid ester salt, soap, and the like; a cationic surfactant such as an amine salt type cationic surfactant and a quaternary ammonium salt type cationic surfactant; a nonionic surfactant based on polyethylene glycol, an alkylphenol ethylene oxide adduct, and a polyhydric alcohol, and the like. Among these, particularly, an anionic surfactant and a cationic surfactant may be exemplified. A nonionic surfactant may be used in combination with an anionic surfactant or a cationic surfactant. The surfactant may be used alone or in combination of two or more kinds thereof.

Examples of the method of allowing the resin particles to be dispersed in the dispersion medium in the resin particle dispersion liquid include typical dispersion methods such as a rotary shear homogenizer, a ball mill having a medium, a sand mill, and a dyno mill. Depending on the kind of resin particles, the resin particles may be dispersed in a dispersion medium by a phase inversion emulsification method. The phase inversion emulsification method is a method of dissolving the resin to be dispersed in a hydrophobic organic solvent in which the resin is soluble, adding a base to an organic continuous phase (O phase) for neutralization, adding an aqueous medium (W phase thereto, performing phase inversion from W/O to O/W, and dispersing the resin in the aqueous medium in the form of particles.

The volume average particle diameter of the resin particles to be dispersed in the resin particle dispersion liquid is, for example, preferably 0.01 μm or more and 1 μm or less, more preferably 0.08 μm or more and 0.8 μm or less, and still more preferably 0.1 μm or more and 0.6 μm or less.

The volume average particle diameter of the resin particles is obtained by drawing cumulative distribution of the volume from the small diameter side for each divided particle size range (channel) and measuring the particle diameter at a cumulative 50% as the volume average particle diameter D50v with respect to the entirety of the particles, using the particle size distribution obtained by performing measurement with a laser diffraction type particle size distribution measuring device (for example, LA-700, manufactured by Horiba, Ltd.). The volume average particle diameter of the particles in another dispersion liquid is measured in the same manner as described above.

The content of the resin particles contained in the resin particle dispersion liquid is, for example, preferably 5% by mass or more and 50% by mass or less and more preferably 10% by mass or more and 40% by mass or less.

Similar to the resin particle dispersion liquid, for example, the colorant particle dispersion liquid and the release agent particle dispersion liquid are also prepared. That is, the same applies to the colorant particles to be dispersed in the colorant particle dispersion liquid and the release agent particles to be dispersed in the release agent particle dispersion liquid in terms of the volume average particle diameter of particles in the resin particle dispersion liquid, the dispersion medium, the dispersion method, and the content of the particles.

First Aggregated Particle Formation Step

The amorphous resin particle dispersion liquid, the colorant particle dispersion liquid, and the release agent particle dispersion liquid are mixed. Further, the amorphous resin particles, the colorant particles, and the release agent particles are heteroaggregated in the mixed dispersion liquid to form first aggregated particles including the amorphous resin particles, the colorant particles, and the release agent particles, which have a diameter close to the diameter of the target toner particles. As the amorphous resin particle dispersion liquid, an amorphous resin particle dispersion liquid in which the amorphous resin particles and the colorant particles are dispersed may be used.

Specifically, for example, the first aggregated particles are formed by adding an aggregating agent to the mixed dispersion liquid, adjusting the pH of the mixed dispersion liquid to be acidic (for example, a pH of 2 or more and 5 or less), adding a dispersion stabilizer thereto as necessary, heating the solution to a temperature close to the glass transition temperature of the resin particles (specifically, for example, a temperature higher than or equal to the glass transition temperature of the resin particles—30° C. and lower than or equal to the glass transition temperature thereof—10° C.) and allowing the particles to be dispersed in the mixed dispersion liquid to be aggregated.

In the first aggregated particle formation step, for example, the heating may be performed after the mixed dispersion liquid is stirred with a rotary shear homogenizer, the aggregating agent is added thereto at room temperature (for example, 25° C.), the pH of the mixed dispersion liquid is adjusted to be acidic (for example, a pH of 2 or more and 5 or less), and the dispersion stabilizer is added thereto as necessary.

Examples of the aggregating agent include a surfactant having a polarity opposite to the polarity of the surfactant contained in the mixed dispersion liquid, an inorganic metal salt, and a divalent or higher valent metal complex. In a case where a metal complex is used as the aggregating agent, the amount of the surfactant to be used is reduced, and the charging characteristics are improved.

In addition to the aggregating agent, an additive that forms a complex or a bond similar to the complex with a metal ion of the aggregating agent may be used as necessary. A chelating agent is used as the additive.

Examples of the inorganic metal salt include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

As the chelating agent, a water-soluble chelating agent may also be used. Examples of the chelating agent include oxycarboxylic acids such as tartaric acid, citric acid, and gluconic acid; and aminocarboxylic acids such as iminodiacetic acid (IDA), nitrilotriacetic acid (NTA), and ethylenediaminetetraacetic acid (EDTA).

The amount of the chelating agent to be added is, for example, preferably 0.01 parts by mass or more and 5.0 parts by mass or less and more preferably 0.1 parts by mass or more and less than 3.0 parts by mass with respect to 100 parts by mass of the resin particles.

Second Aggregated Particle Formation Step

The aggregated particle dispersion liquid in which the first aggregated particles are dispersed is mixed with the amorphous resin particle dispersion liquid and the crystalline resin particle dispersion liquid. The aggregated particle dispersion liquid in which the first aggregated particles are dispersed may be mixed with a mixed solution of the amorphous resin particle dispersion liquid and the crystalline resin particle dispersion liquid. Further, the amorphous resin particles and the crystalline resin particles are aggregated on the surface of the first aggregated particles in the dispersion liquid in which the first aggregated particles, the amorphous resin particles, and the crystalline resin particles are dispersed.

Specifically, for example, the amorphous resin particle dispersion liquid and the crystalline resin particle dispersion liquid are added when the particle diameter of the first aggregated particles reaches the target particle diameter and the solution is heated at a temperature higher than or equal to the glass transition temperature of the amorphous resin particles in the first aggregated particle formation step. This aggregation operation is repeatedly performed two or more times to form second aggregated particles.

Third Aggregated Particle Formation Step

The aggregated particle dispersion liquid in which the second aggregated particles are dispersed are mixed with the amorphous resin particle dispersion liquid. Further, the amorphous resin particles are aggregated on the surface of the second aggregated particles in the dispersion liquid in which the second aggregated particles and the amorphous resin particles are dispersed.

Specifically, for example, the amorphous resin particle dispersion liquid is added when the particle diameter of the second aggregated particles reaches the target particle diameter and the solution is heated at a temperature higher than or equal to the glass transition temperature of the amorphous resin particles in the second aggregated particle formation step. In addition, the pH of the dispersion liquid is adjusted to stop the progress of aggregation.

In the third aggregated particle formation step, it is preferable to add, for example, magnesium chloride to the dispersion liquid so that Mg ions and Cl ions are blended with the toner particles.

Fusion and Coalescence Step

The aggregated particle dispersion liquid in which the third aggregated particles are dispersed is heated to a temperature higher than or equal to the glass transition temperature of the amorphous resin particles (for example, a temperature higher than the glass transition temperature of the amorphous resin particles by 10° C. to 30° C.) and the aggregated particles are fused and coalesced, thereby forming toner particles.

After the heating for fusion and coalescence, the dispersion liquid may be cooled to, for example, 30° C. at a cooling rate of 5° C./min or more and 40° C./min or less. It is assumed that since the surface of the toner particle is easily contracted due to the rapid cooling of the dispersion liquid as described above, cracks are likely to occur from the inside of the toner particle toward the surface of the toner. Next, the dispersion liquid is heated again at 0.1° C./min or more and 2° C./min or less and maintained at a temperature higher than the melting temperature of the crystalline resin by 10° C. or higher for 10 min or longer. Thereafter, the dispersion liquid is slowly cooled at 0.1° C./min or more and 1° C./min or less such that the domain of the crystalline resin grows in the crack direction, the domain of the crystalline resin grows from the inside of the toner particle toward the surface thereof, and the domain of the crystalline resin satisfies the above-described conditions. Further, for example, in a case where the dispersion liquid is heated to a temperature higher than or equal to the melting temperature of the release agent during the reheating of the dispersion liquid, there is a high possibility that the domain of the release agent grows near the surface of the toner particle. Therefore, it is preferable that the heating temperature after the reheating is, for example, higher than the endothermic temperature of the crystalline resin and lower than the melting temperature of the release agent.

After completion of the fusion and coalescence step, toner particles in a dry state are obtained by performing a known cleaning step, a known solid-liquid separation step, and a known drying step on the toner particles formed in the solution. From the viewpoint of the charging properties, for example, displacement cleaning may be sufficiently performed as the cleaning step using ion exchange water. From the viewpoint of the productivity, for example, suction filtration, pressure filtration, or the like may be performed as the solid-liquid separation step. From the viewpoint of the productivity, for example, freeze-drying, flush drying, fluidized drying, vibratory fluidized drying, or the like may be performed as the drying step.

The toner according to the present exemplary embodiment is produced, for example, by adding an external additive to the obtained toner particles in a dry state and mixing the external additive with the toner particles. The mixing may be performed, for example, using a V blender, a Henschel mixer, a Lödige mixer, or the like. Further, coarse particles of the toner may be removed as necessary using a vibratory sieving machine, a pneumatic sieving machine, or the like.

Electrostatic Charge Image Developer

An electrostatic charge image developer according to the present exemplary embodiment contains at least the toner according to the present exemplary embodiment. The electrostatic charge image developer according to the present exemplary embodiment may be a one-component developer which contains only the toner according to the present exemplary embodiment or a two-component developer obtained by mixing the toner and a carrier.

The carrier is not particularly limited, and examples thereof include known carriers. Examples of the carrier include a coated carrier obtained by coating the surface of a core material consisting of magnetic powder with a resin, a magnetic powder dispersion type carrier obtained by dispersing magnetic powder in a matrix resin so as to be blended, and a resin impregnation type carrier obtained by impregnating porous magnetic powder with a resin. Each of the magnetic powder dispersion type carrier and the resin impregnation type carrier may be a carrier obtained by coating the surface of a core material, which is particles configuring the carrier, with a resin.

Examples of the magnetic powder include magnetic metals such as iron, nickel, and cobalt and magnetic oxides such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin formed by having an organosiloxane bond, a product obtained by modifying the straight silicone resin, a fluororesin, polyester, polycarbonate, a phenol resin, and an epoxy resin. The coating resin and the matrix resin may contain other additives such as conductive particles. Examples of the conductive particles include metals such as gold, silver, and copper, and particles such as carbon black, titanium oxide, zinc oxide, tin oxide, barium sulfate, aluminum borate, and potassium titanate.

Examples of a method of coating the surface of the core material with a resin include a method of using a solution for forming a coating layer obtained by dissolving the coating resin and various additives (used as necessary) in an appropriate solvent. The solvent is not particularly limited, and may be selected in consideration of the kind of the resin to be used, coating suitability, and the like.

Specific examples of the resin coating method include a dipping method of dipping the core material in the solution for forming a coating layer, a spray method of spraying the solution for forming a coating layer to the surface of the core material, a fluidized bed method of spraying the solution for forming a coating layer to the core material that is floating by an air flow, and a kneader coater method of mixing the core material of the carrier with the solution for forming a coating layer in a kneader coater and removing the solvent.

The mixing ratio (mass ratio) of the toner to the carrier (toner:carrier) in the two-component developer is, for example, preferably in a range of 1:100 to 30:100 and more preferably in a range of 3:100 to 20:100.

Image Forming Device and Image Forming Method

An image forming device and an image forming method according to the present exemplary embodiment will be described.

The image forming device according to the present exemplary embodiment includes an image holding member, a charging unit that charges a surface of the image holding member, an electrostatic charge image forming unit that forms an electrostatic charge image on the surface of the charged image holding member, a developing unit that accommodates an electrostatic charge image developer and develops the electrostatic charge image formed on the surface of the image holding member as a toner image by the electrostatic charge image developer, a transfer unit that transfers the toner image formed on the surface of the image holding member to a surface of a recording medium, and a fixing unit that fixes the toner image transferred to the surface of the recording medium. Further, the electrostatic charge image developer according to the present exemplary embodiment is applied as the electrostatic charge image developer.

With the image forming device according to the present exemplary embodiment, an image forming method (the image forming method according to the present exemplary embodiment) including a charging step of charging a surface of the image holding member, an electrostatic charge image formation step of forming an electrostatic charge image on the surface of the charged image holding member, a developing step of developing the electrostatic charge image formed on the surface of the image holding member as a toner image by the electrostatic charge image developer according to the present exemplary embodiment, a transfer step of transferring the toner image formed on the surface of the image holding member to a surface of a recording medium, and a fixing step of fixing the toner image transferred to the surface of the recording medium is performed.

As the image forming device according to the present exemplary embodiment, a known image forming device such as a direct transfer type device that directly transfers a toner image formed on a surface of an image holding member to a recording medium, an intermediate transfer type device that primarily transfers a toner image formed on a surface of an image holding member to a surface of an intermediate transfer member and secondarily transfers the toner image transferred to the surface of the intermediate transfer member to a surface of a recording medium, a device that includes a cleaning unit cleaning a surface of an image holding member after transfer of a toner image and before charge of the image holding member, or a device that includes an electricity removing unit removing electricity by irradiating a surface of an image holding member with electricity removing light after transfer of a toner image and before charge of the image holding member is applied.

In a case where the image forming device according to the present exemplary embodiment is the intermediate transfer type device, a configuration in which the transfer unit includes an intermediate transfer member having a surface onto which a toner image is transferred, a primary transfer unit primarily transferring the toner image formed on the surface of the image holding member to the surface of the intermediate transfer member, and a secondary transfer unit secondarily transferring the toner image transferred to the surface of the intermediate transfer member to the surface of the recording medium is applied.

In the image forming device according to the present exemplary embodiment, for example, the portion including the developing unit may have a cartridge structure (process cartridge) that is detachably attached to the image forming device. For example, a process cartridge including a developing unit that accommodates the electrostatic charge image developer according to the present exemplary embodiment is used as the process cartridge.

Hereinafter, an example of the image forming device according to the present exemplary embodiment will be described, but the present exemplary embodiment is not limited thereto. In the description below, main parts shown in the figures will be described, but description of other parts will not be provided.

FIG. 1 is a schematic configuration view showing an image forming device according to the present exemplary embodiment.

The image forming device shown in FIG. 1 includes first to fourth image forming units 10Y, 10M, 10C, and 10K having an electrophotographic system of outputting images of each color of yellow (Y), magenta (M), cyan (C), and black (K) based on color-separated image data. These image forming units (hereinafter, also simply referred to as "units") 10Y, 10M, 10C, and 10K are arranged in parallel at predetermined intervals in the horizontal direction. The units 10Y, 10M, 10C, and 10K may be process cartridges detachably attached to the image forming device.

Above the units 10Y, 10M, 10C, and 10K, an intermediate transfer belt 20 (an example of the intermediate transfer member) extends across each of the units. The intermediate transfer belt 20 is provided by winding around a drive roll 22 and a support roll 24 and travels in a direction from the first unit 10Y toward the fourth unit 10K. A force is applied to the support roll 24 in a direction away from the drive roll 22 by a spring or the like (not shown), and a tension is applied to the intermediate transfer belt 20 winding around the support roll 24 and the drive roll 22. An intermediate transfer member cleaning device 30 facing the drive roll 22 is provided on a side surface of the image holding member of the intermediate transfer belt 20.

Each of yellow toner, magenta toner, cyan toner, and black toner stored in toner cartridges 8Y, 8M, 8C, and 8K is supplied to each of developing devices (an example of developing units) 4Y, 4M, 4C, and 4K of the units 10Y, 10M, 10C, and 10K.

Since the first to fourth units 10Y, 10M, 10C, and 10K have the same configuration and operation, the first unit 10Y that forms a yellow image disposed on the upstream side in the traveling direction of the intermediate transfer belt will be described as a representative example.

The first unit 10Y includes a photoreceptor 1Y that functions as an image holding member. A charging roll (an example of the charging unit) 2Y that charges the surface of the photoreceptor 1Y at a predetermined potential, an exposure device (an example of the electrostatic charge image forming unit) 3 that exposes the charged surface to a laser beam 3Y based on a color-separated image signal to form an electrostatic charge image, a developing device (an example of a developing unit) 4Y that supplies the charged toner to the electrostatic charge image to develop the electrostatic charge image, a primary transfer roll 5Y (an example of the primary transfer unit) that transfers the developed toner image onto the intermediate transfer belt 20, and a photoreceptor cleaning device (an example of the cleaning unit) 6Y that removes the toner remaining on the surface of the photoreceptor 1Y after the primary transfer are arranged in this order in the periphery of the photoreceptor 1Y.

The primary transfer roll 5Y is disposed inside the intermediate transfer belt 20 and provided at a position facing the photoreceptor 1Y. Each bias power supply (not shown) that applies a primary transfer bias is connected to each of the primary transfer rolls 5Y, 5M, 5C, and 5K of the units. Each bias power supply changes the value of the transfer bias applied to each primary transfer roll by the control of a control unit (not shown).

Hereinafter, an operation of forming a yellow image in the first unit 10Y will be described.

First, prior to the operation, the surface of the photoreceptor 1Y is charged at a potential of −600 V to −800 V by the charging roll 2Y.

The photoreceptor 1Y is formed by laminating a photosensitive layer on a conductive substrate (for example, a volume resistivity of $1\times10^{-6}$ Ωcm or less at 20° C.). This photosensitive layer usually has a high resistance (the resistance of a typical resin), but has a property that in a case where the photosensitive layer is irradiated with a laser beam, the specific resistance of the portion irradiated with the laser beam changes. Therefore, the exposure device 3 irradiates the surface of the charged photoreceptor 1Y with the laser beam 3Y based on yellow image data sent from a control unit (not shown). In this manner, an electrostatic charge image in a yellow image pattern is formed on the surface of the photoreceptor 1Y.

The electrostatic charge image is an image formed on the surface of the photoreceptor 1Y by performing charging, which is a so-called negative latent image formed in a case where the specific resistance of the portion in the photosensitive layer irradiated with the laser beam 3Y is decreased by the laser beam 3Y, the charged charge on the surface of the photoreceptor 1Y flows, and the charge in a portion that has not been irradiated with the laser beam 3Y remains.

The electrostatic charge image formed on the photoreceptor 1Y rotates to a predetermined development position according to the traveling of the photoreceptor 1Y. Further, the electrostatic charge image on the photoreceptor 1Y is developed and visualized at this development position as a toner image by the developing device 4Y.

For example, an electrostatic charge image developer containing at least a yellow toner and a carrier is accommodated in the developing device 4Y. The yellow toner is stirred to be frictionally charged inside the developing device 4Y, has a charge having the same polarity (negative polarity) as the charged charge on the photoreceptor 1Y, and is held on a developer roll (an example of the developer holding member). Further, as the surface of the photoreceptor 1Y passes through the developing device 4Y, the yellow toner is electrostatically attached to the statically eliminated latent image portion on the surface of the photoreceptor 1Y, and the latent image is developed by the yellow toner. The photoreceptor 1Y on which the yellow toner image is formed is continuously traveled at a predetermined speed, and the toner image developed on the photoreceptor 1Y is transported to a predetermined primary transfer position.

In a case where the yellow toner image on the photoreceptor 1Y is transported to the primary transfer position, a primary transfer bias is applied to the primary transfer roll 5Y, and an electrostatic force from the photoreceptor 1Y toward the primary transfer roll 5Y acts on the toner image, and the toner image on the photoreceptor 1Y is transferred onto the intermediate transfer belt 20. The transfer bias applied at this time has a polarity (+) opposite to the polarity (−) of the toner and is controlled to, for example, +10 μA by a control unit (not shown) in the first unit 10Y.

Further, the toner remaining on the photoreceptor 1Y is removed by the photoreceptor cleaning device 6Y and recovered.

The primary transfer bias applied to the primary transfer rolls 5M, 5C, and 5K of the second to fourth units 10M, 10C, and 10K is also controlled according to the first unit.

In this manner, the intermediate transfer belt 20 to which the yellow toner image is transferred by the first unit 10Y is sequentially transported through the second to fourth units 10M, 10C, and 10K, and the toner images of each color are superimposed and multiple-transferred.

The intermediate transfer belt 20, to which the toner images of four colors are multiple-transferred through the first to fourth units, reaches a secondary transfer unit formed of the intermediate transfer belt 20, a support roll 24 in contact with the inner surface of the intermediate transfer belt, and a secondary transfer roll (an example of the secondary transfer unit) 26 disposed on the image holding surface side of the intermediate transfer belt 20. Meanwhile, recording paper (an example of the recording medium) P is supplied to a gap where the secondary transfer roll 26 is in contact with the intermediate transfer belt 20 via a supply mechanism, at a predetermined timing, and a secondary transfer bias is applied to the support roll 24. The transfer bias applied at this time has the same polarity (−) as the polarity (−) of the toner, and the electrostatic force from the intermediate transfer belt 20 toward the recording paper P acts on the toner image so that the toner image on the intermediate transfer belt 20 is transferred onto the recording paper P. The secondary transfer bias at this time is determined according to the resistance detected by a resistance detector (not shown) that detects the resistance of the secondary transfer unit, and the voltage is controlled.

Thereafter, the recording paper P is sent to a pressure welding portion (nip portion) of a pair of fixing rolls in a fixing device (an example of the fixing unit) 28, and the toner image is fixed onto the recording paper P to form the fixed image.

Examples of the recording paper P that transfers the toner image include plain paper used in electrophotographic copying machines, printers, and the like. Examples of the recording medium include an OHP sheet in addition to the recording paper P.

In order to further improve the smoothness of the image surface after the fixation, for example, it is preferable that the surface of the recording paper P is also smooth. For example, coated paper in which the surface of plain paper is coated with a resin or the like, art paper for printing, or the like is used.

The recording paper P in which the fixation of the color images is completed is transported toward a discharge unit, and a series of color image forming operations is completed.

Process Cartridge

The process cartridge according to the present exemplary embodiment will be described.

The process cartridge according to the present exemplary embodiment includes a developing unit which accommodates the electrostatic charge image developer according to the present exemplary embodiment and develops the electrostatic charge image formed on the surface of the image holding member as a toner image using the electrostatic charge image developer, and is detachably attached to the image forming device.

The configuration of the process cartridge according to the present exemplary embodiment is not limited thereto, and a configuration including a developing unit and, as necessary, at least one selected from other units such as an image holding member, a charging unit, an electrostatic charge image forming unit, and a transfer unit may be employed.

Hereinafter, an example of the process cartridge according to the present exemplary embodiment will be described, but the present invention is not limited thereto. In the description below, main parts shown in the figures will be described, but description of other parts will not be provided.

Figure 2:
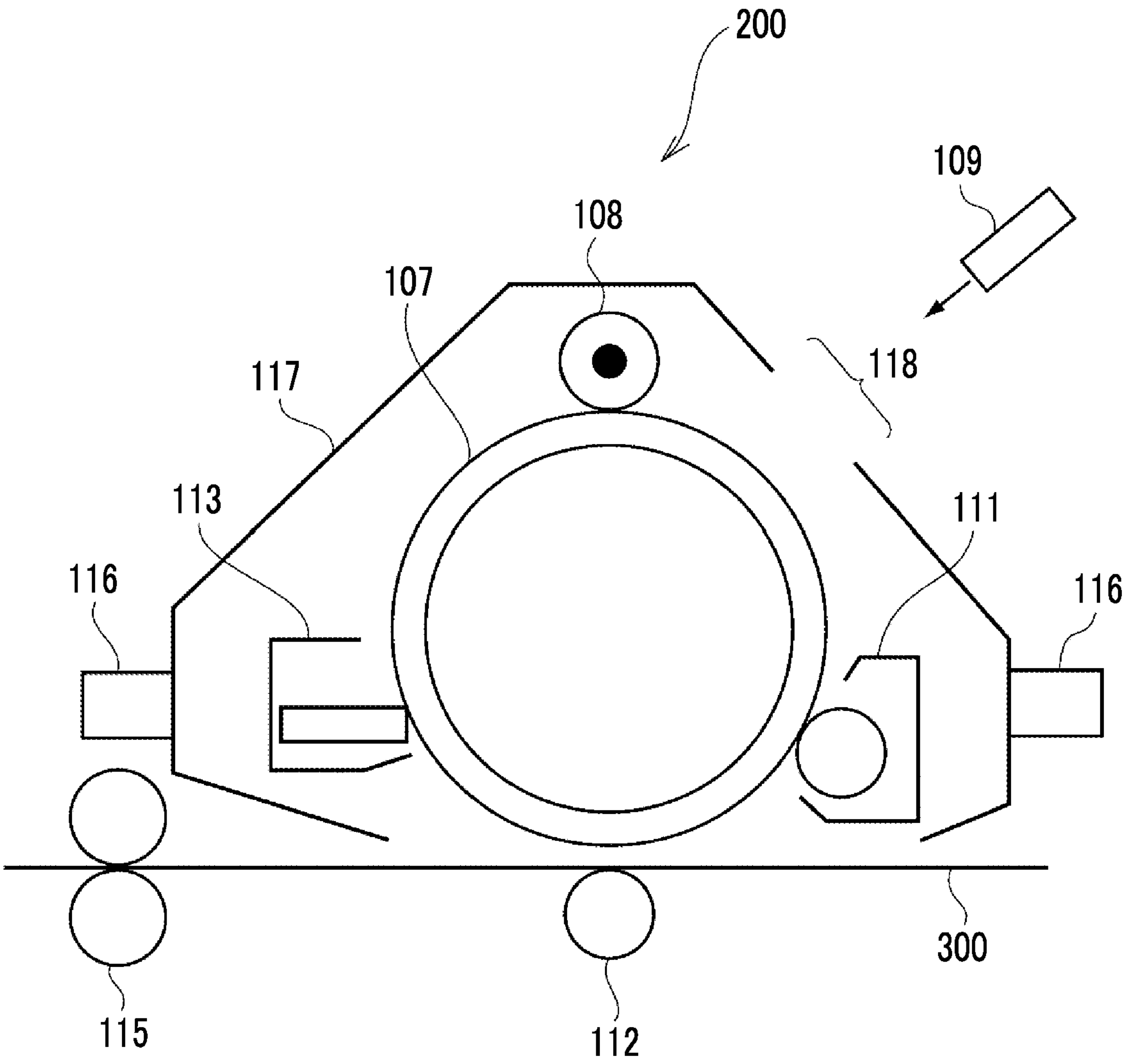
FIG. 2 is a schematic configuration view showing an example of a process cartridge detachably attached to the image forming device according to the present exemplary embodiment.

FIG. 2 is a schematic configuration view showing the process cartridge according to the present exemplary embodiment.

A process cartridge 200 shown in FIG. 2 is configured such that a photoreceptor 107 (an example of the image holding member), a charging roll 108 (an example of the charging unit) provided in the periphery of the photoreceptor 107, a developing device 111 (an example of the developing unit), and a photoreceptor cleaning device 113 (an example of the cleaning unit) are integrally combined and held by a housing 117 provided with a mounting rail 116 and an opening portion 118 for exposure to form a cartridge.

In FIG. 2, the reference numeral 109 represents an exposure device (an example of the electrostatic charge image forming unit), the reference numeral 112 represents a transfer device (an example of the transfer unit), the reference numeral 115 represents a fixing device (an example of the fixing unit), and the reference numeral 300 represents recording paper (an example of the recording medium).

EXAMPLES

Hereinafter, exemplary embodiments of the invention will be described in detail based on examples, but the exemplary embodiments of the invention are not limited to the examples. In the following description, "parts" and "%" are on a mass basis unless otherwise specified.

Synthesis of Amorphous Polyester Resin (A)

Terephthalic acid: 152 parts
Fumaric acid: 75 parts
Dodecenyl succinic acid: 114 parts
Bisphenol A propylene oxide adduct: 469 parts
Bisphenol A ethylene oxide adduct: 137 parts The above-described materials are added to a container provided with a stirrer, a thermometer, a condenser, and a nitrogen gas introduction tube, 4 parts of dibutyltin oxide is put into the container as a catalyst, and nitrogen gas is introduced into the container to prepare an inert atmosphere. The temperature is raised while the inert atmosphere is maintained, and the temperature inside the container is maintained at 150° C. or higher and 230° C. or lower for 12 hours to carried out reaction. Next, the pressure inside the container is gradually reduced while the temperature inside the container is maintained at 210° C. or higher and 250° C. or lower. In this manner, an amorphous polyester resin (A) having an acid value of 15 mgKOH, a weight-average molecular weight of 10500, and a glass transition temperature of 60° C. is obtained.

Preparation of amorphous polyester resin particle dispersion liquid (A1) containing C. I. Pigment Yellow 185

250 parts of the amorphous polyester resin (A) and 50 parts of C. I. Pigment Yellow 185 (manufactured by BASF SE) is added to a Henschel mixer and mixed at a screw rotation speed of 600 rpm for 120 seconds, thereby obtaining a raw material (A). 200 parts of raw material (A), 0.2 parts of a 50% sodium hydroxide aqueous solution, and 10 parts of calcium chloride are put into a raw material inlet port of a twin-screw extruder (TEM-58SS, manufactured by Toshiba Machine Co., Ltd.), 4.1 parts of a 48.5% sodium dodecyldiphenyl ether sulfonate aqueous solution (ELEMINOL MON-7, manufactured by Sanyo Chemical Industries, Ltd.) is poured into the solution from the 4th barrel of the twin-screw extruder, and the solution is kneaded by setting the temperature of each barrel to 95° C. and the screw rotation speed to 240 rpm. 150 parts of ion exchange water at a temperature of 95° C. is poured into the solution from the 5th barrel of the twin-screw extruder, 150 parts by mass of ion exchange water at a temperature of 95° C. is poured into the solution from the 7th barrel thereof, and 15 parts of ion exchange water at a temperature of 95° C. is poured into the solution from the 9th barrel thereof, and the solution is kneaded by setting the average supply amount of the raw material (A) to 200 kg/h, thereby obtaining a resin particle dispersion liquid in which resin particles having a volume average particle diameter of 180 nm are dispersed. The amount of the solid content is adjusted to 25% by adding ion exchange water to the resin particle dispersion liquid, thereby obtaining an amorphous polyester resin particle dispersion liquid (A1) containing C. I. Pigment Yellow 185.

Synthesis of Crystalline Polyester Resin (B)

1,10-Decanedicarboxylic acid: 241 parts
1,9-Nonanediol: 174 parts

The above-described materials are added to a container provided with a stirrer, a thermometer, a condenser, and a nitrogen gas introduction tube, the gas in the container is substituted with dry nitrogen gas, 0.25 parts of titanium tetrabutoxide is put into 100 parts of the above-described materials, and the mixture is stirred and allowed to react at 170° C. for 6 hours in a nitrogen gas stream. Thereafter, the temperature is raised to 210° C., the pressure inside the container is reduced to 3 kPa, and the mixture is stirred and allowed to react under reduced pressure for 13 hours. In this manner, a crystalline polyester resin (B) having an acid value of 10 mgKOH, a weight-average molecular weight of 17200, and a melting temperature of 75° C. is obtained.

Preparation of Crystalline Polyester Resin Particle Dispersion Liquid (B1)

70 parts of ethyl acetate and 15 parts of isopropyl alcohol are added to a separable flask and mixed with each other, 100 parts of the crystalline polyester resin (B) is gradually added thereto, and the mixture is stirred by a three-one motor to dissolve the resin, thereby obtaining an oil phase. 3 parts of a 10% ammonia aqueous solution is added dropwise to the oil phase with a syringe, and 230 parts of ion exchange water is further added dropwise thereto at a dropping rate of 10 ml/min for phase inversion emulsification. Next, the solvent is removed while the pressure is reduced with an evaporator to obtain a resin particle dispersion liquid in which resin particles having a volume average particle diameter of 165 nm are dispersed. The amount of the solid content is adjusted to 25% by adding ion exchange water to the resin particle dispersion liquid, thereby obtaining a crystalline polyester resin particle dispersion liquid (B1).

Preparation of Styrene Acrylic Resin Particle Dispersion Liquid (C1)

Styrene: 300 parts
N-Butyl acrylate: 90 parts
Acrylic acid: 0.1 parts
Dodecanethiol: 1 part
2-(Dimethylamino ester) methacrylate: 1 part The mixture obtained by mixing and dissolving the above-described materials is dispersed and emulsified in a surfactant solution obtained by dissolving 6 parts of a nonionic surfactant (NONIPOL 400, manufactured by Sanyo Chemical Industries, Ltd.) and an anionic surfactant (NEOGEN SC, manufactured by DKS Co., Ltd., dodecylbenzene sulfonic acid) in 550 parts of ion exchange water, in a flask. Next, an aqueous solution obtained by dissolving 4 parts of ammonium persulfate in 50 parts of ion exchange water is added to the solution for 10 minutes while the solution inside the flask is stirred. Nest, after nitrogen substitution, the content inside the flask is heated to 70° C. in an oil bath while the solution is stirred, and the temperature is maintained at 70° C. for 5 hours to continue emulsion polymerization. In this manner, a resin particle dispersion liquid in which resin particles having an acid value of 9 mgKOH, a weight-average molecular weight of 30000, a glass transition temperature of 52° C., and a volume average particle diameter of 120 nm are dispersed is obtained. The amount of the solid content is adjusted to 25% by adding ion exchange water to the resin particle dispersion liquid, thereby obtaining a styrene acrylic resin particle dispersion liquid (C1).

Preparation of Hybrid Resin (Amorphous Resin Having Amorphous Polyester Resin Segment and Styrene Acrylic Resin Segment) Particle Dispersion Liquid (SPE1)

The inside of a four-neck flask provided with a nitrogen introduction tube, a dehydration tube, a stirrer, and a thermocouple is substituted with nitrogen, 5670 parts of polyoxypropylene (2.2)-2,2-bis(4-hydroxyphenyl)propane, 585 parts of polyoxyethylene (2.0)-2,2-bis(4-hydroxyphenyl) propane, 2450 parts of terephthalic acid, and 44 parts of tin (II) di(2-ethylhexanoate) are added to the flask, the mixture is stirred in a nitrogen atmosphere, heated to 235° C., and maintained at the same temperature for 5 hours, and the pressure inside the flask is further reduced and maintained at 8.0 kPa for 1 hour. After the pressure is returned to the atmospheric pressure, the mixture is cooled to 190° C., 42 parts of fumaric acid and 207 parts of trimellitic acid are added thereto, and the mixture is maintained at a temperature of 190° C. for 2 hours and heated to 210° C. for 2 hours. Further, the pressure in the flask is reduced and maintained at 8.0 kPa for 4 hours, thereby obtaining an amorphous polyester resin A (polyester segment).

Next, 800 parts of the amorphous polyester resin A is added to a four-neck flask provided with a cooling tube, a stirrer, and a thermocouple, and the mixture is stirred at a stirring rate of 200 rpm in a nitrogen atmosphere. Thereafter, 40 parts of styrene, 142 parts of ethyl acrylate, parts of acrylic acid, 2 parts of 1,10-decanediol diacrylate, and 1000 parts of toluene are added thereto as addition-polymerizable monomers, and the mixture is further mixed for 30 minutes.

Further, 6 parts of polyoxyethylene alkyl ether (nonionic surfactant, trade name: EMULGEN 430, manufactured by Kao Corporation), 40 parts of a 15% sodium dodecylbenzenesulfonate aqueous solution (anionic surfactant, trade name: NEOPELEX G-15, manufactured by Kao Corporation), and 233 parts of 5% potassium hydroxide are added thereto, and the mixture is heated to 95° C. so as to be melted while being stirred and mixed at 95° C. for 2 hours, thereby obtaining a resin mixture solution.

Next, 1145 parts of deionized water is added dropwise to the resin mixture solution at a rate of 6 parts/min while the resin mixture solution is stirred, thereby obtaining an emulsion. Next, the obtained emulsion is cooled to 25° C. and allowed to pass through a 200 mesh wire mesh, and deionized water is added thereto such that the amount of the solid content is adjusted to 30%, thereby obtaining a hybrid resin particle dispersion liquid (SPE).

Further, the content of the constitutional unit derived from styrene in the synthesized hybrid resin is 4% by mass with respect to the total mass of the hybrid resin. Further, the acid value of the hybrid resin is 11 mgKOH.

Preparation of Hydride Resin Particle Dispersion Liquid (SPE1) Containing C. I. Pigment Yellow 185

A hydride resin particle dispersion liquid (SPE1) containing C. I. Pigment Yellow 185 is obtained using the hydride resin (SPE) in place of the amorphous polyester resin (A) in the preparation of the amorphous polyester resin particle dispersion liquid (A1).

Preparation of Release Agent Particle Dispersion Liquid (W1)

Ester wax (WEP-8, manufactured by NOF Corporation, melting temperature of 79° C.): 100 parts
Anionic surfactant: 1 part
(NEOGEN SC, manufactured by DKS Co., Ltd., dodecylbenzene sulfonic acid)
Ion exchange water: 350 parts The above-described materials are mixed, heated to 100° C., dispersed using a homogenizer (ULTRA-TURRAX T50, manufactured by IKA), and subjected to a dispersion treatment using a pressure discharge type Gaulin homogenizer, thereby obtaining a release agent particle dispersion liquid in which release agent particles having a volume average particle diameter of 200 nm are dispersed. The amount of the solid content is adjusted to 20% by adding ion exchange water to the release agent particle dispersion liquid, thereby obtaining a release agent particle dispersion liquid (W1).

Example 1

Preparation of Toner Particles

Ion exchange water: 200 parts
Amorphous polyester resin particle dispersion liquid (A1): 80 parts Styrene acrylic resin particle dispersion liquid (C1): 50 parts Release agent particle dispersion liquid (W1): 15 parts Anionic surfactant: 2.8 parts (TaycaPower, manufactured by Tayca Corporation, solid content of 12%, sodium dodecylbenzenesulfonate)

The above-described materials are added to a round stainless steel flask, 0.1 N (0.1 mol/L) of nitric acid is added thereto such that the pH is adjusted to 3.5, and a magnesium chloride aqueous solution obtained by dissolving 6 parts of magnesium chloride in 30 parts of ion exchange water is added thereto. After a homogenizer (ULTRA-TURRAX T50, manufactured by IKA) is used for dispersion at 30° C., the solution is heated to 45° C. in a heating oil bath and maintained until the volume average particle diameter reached 4.5 μm.

Next, 30 parts of the amorphous polyester resin particle dispersion liquid (A1) and 15 parts of the crystalline polyester resin particle dispersion liquid (B1) are added to a separate container until the pH thereof reached 4.8 with 0.1 mol/L hydrochloric acid. This solution and 4 parts of the above-described magnesium chloride aqueous solution are added to the dispersion liquid which has been maintained at 45° C. above, and the resulting solution is maintained for 30 minutes. Addition of these three components is performed a total of four times every 30 minutes.

Next, 40 parts of the amorphous polyester resin particle dispersion liquid (A1) and 4 parts of the above-described magnesium chloride aqueous solution are added thereto, 10 parts of a 10% nitrilotriacetic acid metal salt aqueous solution (CHELEST 70, manufactured by Chelest Corporation) is added thereto, and the pH of the addition dispersion liquid is adjusted to 9.0 using 10 parts of a 0.1 mol/L sodium metasilicate aqueous solution.

Next, 1 part of an anionic surfactant (TaycaPower) is put into the solution, and the solution is heated to 85° C. at a temperature rising rate of 0.05° C./min while being continuously stirred, maintained at 85° C. for 3 hours, and cooled to 30° C. at 15° C./min (first cooling). Thereafter, the solution is heated to 85° C. (reheated) at a temperature rising rate of 0.2° C./min, maintained for 30 minutes, and cooled to 30° C. at 0.5° C./min (second cooling).

Next, the solid content is separated by filtration, cleaned with ion exchange water, and dried, thereby obtaining toner particles (1) having a volume average particle diameter of 6.0 μm.

External Addition of External Additive 100 parts of the toner particles (1) and 1.5 parts of hydrophobic silica (RY50, manufactured by Nippon Aerosil Co., Ltd.) are mixed using a sample mill at a rotation speed of 10000 rpm for 30 seconds. The mixture is sieved with a vibrating sieve having an opening size of 45 μm, thereby obtaining a toner (1). The volume average particle diameter of the toner (1) is 6.0 μm.

Measurement of Domain in Toner Particles

The domains in the toner particles are measured according to the method described above. The toner of Example 1 contains toner particles satisfying all Condition (A), Condition (B1), Condition (B2), Condition (C), Condition (D), and Condition (E), and the content of such toner particles is 70% by number or more with respect to the entirety of the toner particles.

Preparation of Carrier

After 500 parts of spherical magnetite powder particles (volume average particle diameter of 0.55 μm) are stirred with a Henschel mixer, 5 parts of a titanate-based coupling agent is added thereto, and the mixture is heated to 100° C. and stirred for 30 minutes. Next, 6.25 parts of phenol, 9.25 parts of 35% formalin, 500 parts of magnetite particles which has been treated with a titanate-based coupling agent, 6.25 parts of 25% ammonia water, and 425 parts of water are added to a four-neck flask and allowed to react at 85° C. for 120 minutes while being stirred. Thereafter, the mixture is cooled to 25° C., 500 parts of water is added thereto, the supernatant is removed, and the precipitate is cleaned with water. The precipitate which has been cleaned with water is heated under reduced pressure and dried, thereby obtaining a carrier (M) having an average particle diameter of 35 μm.

Mixing of Toner and Carrier

The toner (1) and the carrier (M) are added to a V blender at a ratio (toner (1):carrier (M)) of 5:95 (mass ratio) and stirred for 20 minutes, thereby obtaining a developer (1).

Example 2

15 parts of calcium chloride is used in the preparation of the amorphous polyester resin particle dispersion liquid (A1).

Toner particles are prepared in the same manner as in Example 1 except that the obtained amorphous polyester resin particle dispersion liquid is used.

Further, a toner and a developer are prepared in the same manner as in Example 1 except that the obtained toner is used.

Example 3

4 parts of calcium chloride is used in the preparation of the amorphous polyester resin particle dispersion liquid (A1).

Toner particles are prepared in the same manner as in Example 1 except that the obtained amorphous polyester resin particle dispersion liquid is used.

Further, a toner and a developer are prepared in the same manner as in Example 1 except that the obtained toner is used.

Example 4

7 parts of calcium chloride is used in the preparation of the amorphous polyester resin particle dispersion liquid (A1).

Toner particles are prepared in the same manner as in Example 1 except that the obtained amorphous polyester resin particle dispersion liquid is used.

Further, a toner and a developer are prepared in the same manner as in Example 1 except that the obtained toner is used.

Example 5

12 parts of calcium chloride is used in the preparation of the amorphous polyester resin particle dispersion liquid (A1).

Toner particles are prepared in the same manner as in Example 1 except that the obtained amorphous polyester resin particle dispersion liquid is used.

Further, a toner and a developer are prepared in the same manner as in Example 1 except that the obtained toner is used.

Example 6

5 parts of calcium chloride is used in the preparation of the amorphous polyester resin particle dispersion liquid (A1).

Toner particles are prepared in the same manner as in Example 1 except that the obtained amorphous polyester resin particle dispersion liquid is used.

Further, a toner and a developer are prepared in the same manner as in Example 1 except that the obtained toner is used.

Example 7

14 parts of calcium chloride is used in the preparation of the amorphous polyester resin particle dispersion liquid (A1).

Toner particles are prepared in the same manner as in Example 1 except that the obtained amorphous polyester resin particle dispersion liquid is used.

Further, a toner and a developer are prepared in the same manner as in Example 1 except that the obtained toner is used.

Example 8

5 parts of calcium chloride is used in the preparation of the amorphous polyester resin particle dispersion liquid (A1).

Toner particles are prepared in the same manner as in Example 1 except that the obtained amorphous polyester resin particle dispersion liquid is used and the pH of the addition dispersion liquid is adjusted to 5.1.

Further, a toner and a developer are prepared in the same manner as in Example 1 except that the obtained toner is used.

Example 9

15 parts of calcium chloride is used in the preparation of the amorphous polyester resin particle dispersion liquid (A1).

Toner particles are prepared in the same manner as in Example 1 except that the obtained amorphous polyester resin particle dispersion liquid is used and the pH of the addition dispersion liquid is adjusted to 4.3.

Further, a toner and a developer are prepared in the same manner as in Example 1 except that the obtained toner is used.

Example 10

5 parts of calcium chloride is used in the preparation of the amorphous polyester resin particle dispersion liquid (A1).

Toner particles are prepared in the same manner as in Example 1 except that the obtained amorphous polyester resin particle dispersion liquid is used and the pH of the addition dispersion liquid is adjusted to 5.8.

Further, a toner and a developer are prepared in the same manner as in Example 1 except that the obtained toner is used.

Example 11

15 parts of calcium chloride is used in the preparation of the amorphous polyester resin particle dispersion liquid (A1).

Toner particles are prepared in the same manner as in Example 1 except that the obtained amorphous polyester resin particle dispersion liquid is used and the pH of the addition dispersion liquid is adjusted to 3.8.

Further, a toner and a developer are prepared in the same manner as in Example 1 except that the obtained toner is used.

Example 12

7 parts of calcium chloride is used in the preparation of the amorphous polyester resin particle dispersion liquid (A1).

Toner particles are prepared in the same manner as in Example 1 except that the obtained amorphous polyester resin particle dispersion liquid is used and the pH of the addition dispersion liquid is adjusted to 5.5.

Further, a toner and a developer are prepared in the same manner as in Example 1 except that the obtained toner is used.

Example 13

15 parts of calcium chloride is used in the preparation of the amorphous polyester resin particle dispersion liquid (A1).

Toner particles are prepared in the same manner as in Example 1 except that the obtained amorphous polyester resin particle dispersion liquid is used and the pH of the addition dispersion liquid is adjusted to 4.5.

Further, a toner and a developer are prepared in the same manner as in Example 1 except that the obtained toner is used.

Example 14

6 parts of calcium chloride is used in the preparation of the amorphous polyester resin particle dispersion liquid (A1).

Toner particles are prepared in the same manner as in Example 1 except that the obtained amorphous polyester resin particle dispersion liquid is used and the pH of the addition dispersion liquid is adjusted to 5.6.

Further, a toner and a developer are prepared in the same manner as in Example 1 except that the obtained toner is used.

Example 15

16 parts of calcium chloride is used in the preparation of the amorphous polyester resin particle dispersion liquid (A1).

Toner particles are prepared in the same manner as in Example 1 except that the obtained amorphous polyester resin particle dispersion liquid is used and the pH of the addition dispersion liquid is adjusted to 4.0.

Further, a toner and a developer are prepared in the same manner as in Example 1 except that the obtained toner is used.

Example 16

5 parts of calcium chloride is used in the preparation of the amorphous polyester resin particle dispersion liquid (A1).

Toner particles are prepared in the same manner as in Example 1 except that the obtained amorphous polyester resin particle dispersion liquid is used and 9 parts of a 10% nitrilotriacetic acid metal salt aqueous solution (CHELEST 70, manufactured by Chelest Corporation) is used.

Further, a toner and a developer are prepared in the same manner as in Example 1 except that the obtained toner is used.

Example 17

15 parts of calcium chloride is used in the preparation of the amorphous polyester resin particle dispersion liquid (A1).

Toner particles are prepared in the same manner as in Example 1 except that the obtained amorphous polyester resin particle dispersion liquid is used and 11 parts of a 10% nitrilotriacetic acid metal salt aqueous solution (CHELEST 70, manufactured by Chelest Corporation) is used.

Further, a toner and a developer are prepared in the same manner as in Example 1 except that the obtained toner is used.

Example 18

5 parts of calcium chloride is used in the preparation of the amorphous polyester resin particle dispersion liquid (A1).

Toner particles are prepared in the same manner as in Example 1 except that the obtained amorphous polyester resin particle dispersion liquid is used and 8 parts of a 10% nitrilotriacetic acid metal salt aqueous solution (CHELEST 70, manufactured by Chelest Corporation) is used.

Further, a toner and a developer are prepared in the same manner as in Example 1 except that the obtained toner is used.

Example 19

16 parts of calcium chloride is used in the preparation of the amorphous polyester resin particle dispersion liquid (A1).

Toner particles are prepared in the same manner as in Example 1 except that the obtained amorphous polyester resin particle dispersion liquid is used and 12 parts of a 10% nitrilotriacetic acid metal salt aqueous solution (CHELEST 70, manufactured by Chelest Corporation) is used.

Further, a toner and a developer are prepared in the same manner as in Example 1 except that the obtained toner is used.

Example 20

Toner particles are prepared in the same manner as in Example 1 except that the same amount of the hybrid resin particle dispersion liquid (SPE1) is used in place of the amorphous polyester resin particle dispersion (A1) and the styrene acrylic resin particle dispersion liquid (C1).

Further, a toner and a developer are prepared in the same manner as in Example 1 except that the obtained toner is used.

Example 21

C. I. Pigment Yellow 139 is used in place of C. I. Pigment Yellow 185 in the preparation of the amorphous polyester resin particle dispersion liquid (A1).

Toner particles are prepared in the same manner as in Example 1 except that the obtained amorphous polyester resin particle dispersion liquid is used.

Further, a toner and a developer are prepared in the same manner as in Example 1 except that the obtained toner is used.

Example 22

Paraffin wax (HNP9, manufactured by Nippon Seiro Co., Ltd., melting temperature of 77° C.) is used in place of ester wax (WEP-8, manufactured by NOF Corporation, melting temperature of 79° C.) in the preparation of the release agent particle dispersion liquid (W1).

Toner particles are prepared in the same manner as in Example 1 except that the obtained release agent particle dispersion liquid is used.

Further, a toner and a developer are prepared in the same manner as in Example 1 except that the obtained toner is used.

Example 23: Kneaded and Pulverized Toner

Polyester resin (terephthalic acid/bisphenol A ethylene oxide adduct/linear polyester obtained by polycondensation of cyclohexanedimethanol, Mn=4000, Mw=12000, Tg=62° C.): 100 parts Yellow Pigment: C. I. Pigment Yellow 185 (manufactured by BASF SE): 4 parts by mass 5'-Chloro-3-hydroxy-2'-methoxy-2-naphthanilide (manufactured by Tokyo Chemical Industry Co., Ltd., used after dilution with 1% aqueous solution): 0.2 part EMULGEN 150 (manufactured by Kao Corporation): 0.07 copies Calcium chloride: 0.4 parts Sodium chloride: 0.1 part The above-described components are sufficiently premixed with a Henschel mixer, melt-kneaded with a twin-screw roll mill, cooled, finely pulverized with a jet mill, and further classified twice with a wind power type classifier, thereby producing toner particles.

Further, a toner and a developer are prepared in the same manner as in Example 1 except that the obtained toner is used.

Comparative Example 1

2 parts of calcium chloride is used in the preparation of the amorphous polyester resin particle dispersion liquid (A1).

Toner particles are prepared in the same manner as in Example 1 except that the obtained amorphous polyester resin particle dispersion liquid is used and 12 parts of a 10% nitrilotriacetic acid metal salt aqueous solution (CHELEST 70, manufactured by Chelest Corporation) is used.

Further, a toner and a developer are prepared in the same manner as in Example 1 except that the obtained toner is used.

Comparative Example 2

18 parts of calcium chloride is used in the preparation of the amorphous polyester resin particle dispersion liquid (A1).

Toner particles are prepared in the same manner as in Example 1 except that the obtained amorphous polyester resin particle dispersion liquid is used.

Further, a toner and a developer are prepared in the same manner as in Example 1 except that the obtained toner is used.

Further, the domains in the toner particles prepared in Examples 2 to 23 and Comparative Examples 1 and 2 are measured according to the method described above.

The toner particles prepared in Examples 2 to 22 include toner particles (first toner particles and second toner particles) satisfying all Condition (A), Condition (B1), Condition (B2), Condition (C), Condition (D), and Condition (E), and the content of such toner particles is 70% by number or more with respect to the entirety of the toner particles.

Meanwhile, the toner particles prepared in Example 23 did not include the first toner particles and the second toner particles.

Measurement of Net Intensity of Each Element

The Net intensities of the following elements in the toner particles of each example are measured according to the method described above. The results are listed in Table 1.

Total Net intensity $N_A$ of alkali metal and alkaline earth metal (noted as "ALKALI ($N_A$)" in table)

Net intensity $N_N$ of Na (noted as "Na ($N_N$)" in table)

Net intensity $N_M$ of Mg (noted as "Mg ($N_M$)" in table)

Net intensity $N_{Ca}$ of Ca (noted as "Ca ($N_{Ca}$)" in table)

Total Net intensity $N_{A-NM}$ of alkali metal and alkaline earth metal other than Na, Mg, and Ca (noted as "ALKALI-(Na+Mg+Ca) ($N_{A-NMC}$)" in table)

Net intensity $N_{Cl}$ of Cl (noted as "Cl ($N_{Cl}$)" in table))

Performance Evaluation of Developer

Image Unevenness

The image unevenness is evaluated in the following manner.

The developer of each example is packed at a yellow engine position of a modified machine DocuCenterColor400 (manufactured by Fuji Xerox Co., Ltd.) in an environment at a temperature of 10° C. and a humidity of 15%, 10000 sheets of full solid images (image density of 100%) are output, and the image quality is evaluated with the 10000th sheet. The densities of 9 points of the obtained image are measured, evaluated by the maximum density difference, and determined based on the following standards. The evaluation range up to G3 is set as an allowable range.

Evaluation Standards

G1: The maximum density difference is 0.02 or less

G2: The maximum density difference is more than 0.02 and 0.04 or less

G3: The maximum density difference is more than 0.04 and 0.06 or less

G4: The maximum density difference is more than 0.08 and 0.10 or less

G5: The maximum density difference is more than 0.10

TABLE 1

| | Net intensity of each element in toner particles (kcps) | | | | | | | | | | | | | |
|---|---|---|---|---|---|---|---|---|---|---|---|---|---|---|
| | ALKALI ($N_A$) | Na ($N_N$) | Mg ($N_M$) | Ca ($N_{Ca}$) | ALKALI − (Na + Mg + Ca) ( $N_{A-NMC}$) | Cl ($N_{Cld}$) | $N_A/N_{Cl}$ | $N_N/N_{Cl}$ | $N_M/N_{Cl}$ | $N_{ca}/N_{Cl}$ | Release agent | Proportion of first toner particles % By number | Proportion of second toner particles % By number | Image uneven-ness |
| Example 1 | 2.50 | 0.20 | 0.30 | 2.00 | 6 | 0.40 | 6.25 | 0.5 | 0.75 | 5 | Ester wax | ≥70 | ≥70 | G1 |
| Example 2 | 3.92 | 0.24 | 0.30 | 3.38 | 5 | 0.83 | 4.7229 | 0.289 | 0.361 | 4.072 | Ester wax | ≥70 | ≥70 | G3 |
| Example 3 | 1.50 | 0.20 | 0.30 | 1.00 | 6 | 0.25 | 6 | 0.8 | 1.2 | 4 | Ester wax | ≥70 | ≥70 | G2 |
| Example 4 | 2.03 | 0.21 | 0.30 | 1.52 | 6 | 0.32 | 6.3438 | 0.656 | 0.938 | 4.75 | Ester wax | ≥70 | ≥70 | G1 |
| Example 5 | 3.42 | 0.22 | 0.33 | 2.87 | 5 | 0.70 | 4.8857 | 0.314 | 0.471 | 4.1 | Ester wax | ≥70 | ≥70 | G1 |
| Example 6 | 1.87 | 0.20 | 0.30 | 1.37 | 8 | 0.24 | 7.7917 | 0.833 | 1.25 | 5.708 | Ester wax | ≥70 | ≥70 | G2 |
| Example 7 | 3.60 | 0.22 | 0.33 | 3.05 | 6 | 0.65 | 5.5385 | 0.338 | 0.508 | 4.692 | Ester wax | ≥70 | ≥70 | G2 |
| Example 8 | 2.27 | 0.22 | 0.33 | 1.72 | 38 | 0.06 | 37.833 | 3.667 | 5.5 | 28.67 | Ester wax | ≥70 | ≥70 | G3 |
| Example 9 | 3.68 | 0.20 | 0.28 | 3.20 | 4 | 0.95 | 3.8737 | 0.211 | 0.295 | 3.368 | Ester wax | ≥70 | ≥70 | G3 |
| Example 10 | 1.86 | 0.23 | 0.25 | 1.38 | 47 | 0.04 | 46.5 | 5.75 | 6.25 | 34.5 | Ester wax | ≥70 | ≥70 | G3 |
| Example 11 | 3.73 | 0.25 | 0.28 | 3.20 | 3 | 1.20 | 3.1083 | 0.208 | 0.233 | 2.667 | Ester wax | ≥70 | ≥70 | G3 |
| Example 12 | 2.41 | 0.18 | 0.25 | 1.98 | 10 | 0.25 | 9.64 | 0.72 | 1 | 7.92 | Ester wax | ≥70 | ≥70 | G2 |
| Example 13 | 3.71 | 0.20 | 0.33 | 3.18 | 5 | 0.75 | 4.9467 | 0.267 | 0.44 | 4.24 | Ester wax | ≥70 | ≥70 | G2 |
| Example 14 | 2.38 | 0.18 | 0.28 | 1.92 | 13 | 0.18 | 13.222 | 1 | 1.556 | 10.67 | Ester wax | ≥70 | ≥70 | G3 |
| Example 15 | 3.78 | 0.20 | 0.30 | 3.28 | 4 | 0.88 | 4.2955 | 0.227 | 0.341 | 3.727 | Ester wax | ≥70 | ≥70 | G3 |
| Example 16 | 2.80 | 0.18 | 0.22 | 2.40 | 3 | 0.92 | 3.0435 | 0.196 | 0.239 | 2.609 | Ester wax | ≥70 | ≥70 | G2 |
| Example 17 | 3.33 | 1.50 | 0.35 | 1.48 | 48 | 0.07 | 47.571 | 21.43 | 5 | 21.14 | Ester wax | ≥70 | ≥70 | G2 |
| Example 18 | 2.30 | 0.12 | 0.18 | 2.00 | 2 | 0.94 | 2.4468 | 0.128 | 0.191 | 2.128 | Ester wax | ≥70 | ≥70 | G3 |
| Example 19 | 3.08 | 1.41 | 0.35 | 1.32 | 51 | 0.06 | 51.333 | 23.5 | 5.833 | 22 | Ester wax | ≥70 | ≥70 | G3 |
| Example 20 | 2.48 | 0.22 | 0.31 | 1.95 | 6 | 0.41 | 6.0488 | 0.537 | 0.756 | 4.756 | Ester wax | ≥70 | ≥70 | G2 |
| Example 21 | 2.47 | 0.21 | 0.3 | 1.96 | 6 | 0.41 | 6.0244 | 0.512 | 0.732 | 4.78 | Ester wax | ≥70 | ≥70 | G3 |
| Example 22 | 2.56 | 0.25 | 0.32 | 1.99 | 6 | 0.42 | 6.0952 | 0.595 | 0.762 | 4.738 | Paraffin wax | ≥70 | ≥70 | G2 |
| Example 23 | 2.54 | 0.32 | 0.00 | 2.22 | 5 | 0.54 | 4.7037 | 0.593 | 0 | 4.111 | Ester wax | 0 | 0 | G3 |
| Comparative Example 1 | 1.41 | 0.08 | 0.18 | 1.15 | 6 | 0.23 | 6.1304 | 0.348 | 0.783 | 5 | Ester wax | ≥70 | ≥70 | G5 |
| Comparative Example 2 | 4.30 | 0.32 | 0.38 | 3.60 | 5 | 0.80 | 5.375 | 0.4 | 0.475 | 4.5 | Ester wax | ≥70 | ≥70 | G4 |

Examples 101 to 129

Toner particles (101) to (129) are respectively prepared in the same manner as in the preparation of the toner particles (1) except that the amount of the resin particle dispersion liquid used in the second aggregated particle formation step, the amount of the resin particle dispersion liquid used in the third aggregated particle formation step, and the fusion and coalescence step are adjusted such that the domain of the crystalline resin and the domain of the release agent in the toner particles have the characteristics listed in Tables 2 and 3. The cooling rate of the first cooling, the holding temperature after the reheating, and the cooling rate of the second cooling in the fusion and coalescence step are carried out as listed in Table 2.

Toners (101) to (129) and developers (101) to (129) are prepared in the same manner as in the preparation of the toner (1) and the developer (1) except that one of the toner particles (101) to (129) are used in place of the toner particles (1).

The Net intensity (unit: kcps) of each element is acquired by performing qualitative and quantitative element analysis with an X-ray analyzer (ZSX PrimusII, manufactured by Rigaku Corporation) using the toners (101) to (129) as samples. As a result, in the toner particles of Examples 101 to 129, the total Net intensity $N_A$ of the alkali metal and the alkaline earth metal is 1.50 kcps or more and 4.00 kcps or less, and the Net intensity $N_{Cl}$ of Cl is 0.05 kcps or more and 1.00 kcps or less.

TABLE 2

| | Particle diameter D50v of aggregated particles of core portion | Cooling rate in first cooling | Holding temperature after reheating | Cooling rate in second cooling | Particle diameter D50v of final toner particles (μm) |
|---|---|---|---|---|---|
| Example 101 | 4.9 | 15° C./min | 80° C. | 0.5° C./min | 5.8 |
| Example 102 | 4.9 | 15° C./min | 92° C. | 0.5° C./min | 5.9 |
| Example 103 | 4.9 | 15° C./min | 80° C. | 0.5° C./min | 5.8 |
| Example 104 | 4.9 | 15° C./min | 80° C. | 0.5° C./min | 5.7 |
| Example 105 | 4.9 | 5° C./min | 92° C. | 1° C./min | 5.8 |
| Example 106 | 4.9 | 15° C./min | 92° C. | 1° C./min | 5.8 |
| Example 107 | 4.9 | 5° C./min | 92° C. | 0.5° C./min | 5.8 |
| Example 108 | 4.9 | 5° C./min | 80° C. | 1° C./min | 5.8 |
| Example 109 | 4.9 | 15° C./min | 80° C. | 1° C./min | 5.8 |
| Example 110 | 4.9 | 5° C./min | 80° C. | 0.5° C./min | 5.8 |
| Example 111 | 3.4 | 5° C./min | 92° C. | 1° C./min | 4.1 |
| Example 112 | 3.4 | 10° C./min | 92° C. | 1° C./min | 4.0 |
| Example 113 | 3.4 | 15° C./min | 92° C. | 1° C./min | 4.1 |
| Example 114 | 3.4 | 10° C./min | 92° C. | 1.5° C./min | 4.1 |
| Example 115 | 3.4 | 15° C./min | 92° C. | 1.5° C./min | 4.2 |
| Example 116 | 3.4 | 5° C./min | 80° C. | 1° C./min | 4.1 |
| Example 117 | 3.4 | 15° C./min | 80° C. | 1° C./min | 4.1 |
| Example 118 | 3.4 | 5° C./min | 80° C. | 0.5° C./min | 4.1 |
| Example 119 | 3.4 | 15° C./min | 80° C. | 0.5° C./min | 4.1 |
| Example 120 | 6.9 | 15° C./min | 92° C. | 1° C./min | 8.0 |
| Example 121 | 6.9 | 15° C./min | 92° C. | 0.7° C./min | 8.1 |
| Example 122 | 6.9 | 5° C./min | 92° C. | 0.3° C./min | 8.0 |
| Example 123 | 6.9 | 15° C./min | 92° C. | 0.3° C./min | 8.2 |
| Example 124 | 6.9 | 15° C./min | 80° C. | 1° C./min | 8.0 |
| Example 125 | 6.9 | 15° C./min | 80° C. | 0.7° C./min | 8.0 |
| Example 126 | 6.9 | 5° C./min | 80° C. | 0.3° C./min | 8.1 |
| Example 127 | 6.9 | 15° C./min | 80° C. | 0.3° C./min | 8.0 |
| Example 128 | 4.9 | 15° C./min | 80° C. | 15° C./min | 5.8 |
| Example 129 | — | 1° C./min | — | — | 5.8 |

TABLE 3

| | | Crystalline resin domain A | | | | Crystalline resin domain B | | | | Crossing | Release agent domain | |
|---|---|---|---|---|---|---|---|---|---|---|---|---|
| | Maximum diameter of toner particle (μm) | Aspect ratio AR — | Major axis length $L_{cry}$ μm | Ratio of major axis length to maximum diameter of toner particle % | Angle between major axis and tangent line $\theta_A$ Degrees | Aspect ratio AR — | Major axis length $L_{cry}$ μm | Ratio of major axis length to maximum diameter of toner particle % | Angle between major axis and tangent line $\theta_A$ Degrees | angle between extension lines of major axes of A and B $\theta_B$ Degrees | Type — | Shortest distance nm |
| Example 101 | 5.8 | 32 | 1.5 | 26 | 89 | 23 | 1.1 | 19 | 85 | 75 | Ester wax | 60 |
| Example 102 | 5.9 | 31 | 1.4 | 24 | 88 | 27 | 1.3 | 22 | 72 | 69 | Ester wax | 30 |
| Example 103 | 5.8 | 22 | 1.1 | 19 | 84 | 25 | 1.2 | 21 | 81 | 76 | Paraffin wax | 60 |
| Example 104 | 5.7 | 27 | 1.3 | 23 | 86 | 20 | 0.9 | 16 | 80 | 63 | Polyethylene wax | 70 |
| Example 105 | 5.8 | 17 | 0.8 | 14 | 85 | 13 | 0.6 | 10 | 75 | 77 | Ester wax | 20 |
| Example 106 | 5.8 | 19 | 0.9 | 16 | 80 | 15 | 0.7 | 12 | 76 | 83 | Ester wax | 30 |

TABLE 3-continued

| | Maximum diameter of toner particle (μm) | Crystalline resin domain A: Aspect ratio AR — | Crystalline resin domain A: Major axis length $L_{cry}$ μm | Crystalline resin domain A: Ratio of major axis length to maximum diameter of toner particle % | Crystalline resin domain A: Angle between major axis and tangent line $θ_A$ Degrees | Crystalline resin domain B: Aspect ratio AR — | Crystalline resin domain B: Major axis length $L_{cry}$ μm | Crystalline resin domain B: Ratio of major axis length to maximum diameter of toner particle % | Crystalline resin domain B: Angle between major axis and tangent line $θ_A$ Degrees | Crossing angle between extension lines of major axes of A and B $θ_B$ Degrees | Release agent domain: Type — | Release agent domain: Shortest distance nm |
|---|---|---|---|---|---|---|---|---|---|---|---|---|
| Example 107 | 5.8 | 32 | 1.5 | 26 | 88 | 23 | 1.2 | 21 | 82 | 75 | Ester wax | 30 |
| Example 108 | 5.8 | 14 | 0.7 | 12 | 88 | 17 | 0.8 | 14 | 77 | 53 | Ester wax | 60 |
| Example 109 | 5.8 | 13 | 0.6 | 10 | 80 | 19 | 0.9 | 16 | 69 | 82 | Ester wax | 70 |
| Example 110 | 5.8 | 21 | 1.0 | 17 | 86 | 27 | 1.3 | 22 | 80 | 61 | Ester wax | 50 |
| Example 111 | 4.1 | 16 | 0.7 | 17 | 87 | 11 | 0.5 | 12 | 76 | 48 | Ester wax | 20 |
| Example 112 | 4.0 | 13 | 0.6 | 15 | 82 | 17 | 0.8 | 20 | 80 | 67 | Ester wax | 20 |
| Example 113 | 4.1 | 27 | 1.3 | 32 | 88 | 22 | 1.1 | 27 | 73 | 82 | Ester wax | 20 |
| Example 114 | 4.1 | 10 | 0.4 | 10 | 83 | 11 | 0.5 | 12 | 72 | 52 | Ester wax | 20 |
| Example 115 | 4.2 | 5 | 0.3 | 7 | 86 | 9 | 0.4 | 10 | 81 | 73 | Ester wax | 20 |
| Example 116 | 4.1 | 23 | 0.5 | 12 | 88 | 20 | 0.7 | 17 | 75 | 76 | Ester wax | 60 |
| Example 117 | 4.1 | 20 | 0.8 | 20 | 86 | 30 | 0.5 | 12 | 82 | 81 | Ester wax | 60 |
| Example 118 | 4.1 | 27 | 1.3 | 32 | 82 | 29 | 1.4 | 34 | 73 | 69 | Ester wax | 60 |
| Example 119 | 4.1 | 22 | 1.4 | 34 | 87 | 26 | 1.1 | 27 | 80 | 72 | Ester wax | 60 |
| Example 120 | 8.0 | 10 | 0.5 | 6 | 88 | 15 | 0.6 | 8 | 75 | 73 | Ester wax | 40 |
| Example 121 | 8.1 | 20 | 1.0 | 12 | 86 | 9 | 0.5 | 6 | 79 | 69 | Ester wax | 40 |
| Example 122 | 8.0 | 38 | 1.8 | 23 | 82 | 29 | 1.4 | 18 | 76 | 76 | Ester wax | 40 |
| Example 123 | 8.2 | 31 | 1.5 | 18 | 85 | 36 | 1.7 | 21 | 80 | 53 | Ester wax | 40 |
| Example 124 | 8.0 | 14 | 0.6 | 8 | 83 | 25 | 0.5 | 6 | 81 | 64 | Ester wax | 60 |
| Example 125 | 8.0 | 22 | 1.1 | 14 | 84 | 17 | 0.8 | 10 | 76 | 73 | Ester wax | 60 |
| Example 126 | 8.1 | 38 | 1.8 | 22 | 85 | 35 | 1.7 | 21 | 68 | 68 | Ester wax | 60 |
| Example 127 | 8.0 | 33 | 1.6 | 20 | 86 | 34 | 1.7 | 21 | 72 | 82 | Ester wax | 60 |
| Example 128 | 5.8 | 3 | 0.25 | 4 | 52 | 2 | 0.2 | 3 | 38 | 52 | Ester wax | 60 |
| Example 129 | 5.8 | 16 | 0.8 | 14 | 88 | 14 | 0.7 | 12 | 87 | 2 | Ester wax | 20 |

TABLE 4

| | Proportion of toner particles satisfying each condition (% by number): First toner particles A | First toner particles A satisfying Condition E | Second toner particles B | Second toner particles B satisfying Condition E | Second toner particles A | Second toner particles A satisfying Condition E | Second toner particles B | Second toner particles satisfying Condition E | Evaluation Image unevenness |
|---|---|---|---|---|---|---|---|---|---|
| Example 101 | 94 | 87 | 77 | 73 | 92 | 83 | 76 | 72 | G1 |
| Example 102 | 81 | 0 | 75 | 0 | 78 | 0 | 70 | 0 | G3 |
| Example 103 | 82 | 75 | 74 | 70 | 79 | 74 | 73 | 71 | G2 |
| Example 104 | 86 | 83 | 76 | 73 | 83 | 79 | 74 | 70 | G1 |
| Example 105 | 37 | 0 | 26 | 0 | 34 | 0 | 24 | 0 | G1 |
| Example 106 | 47 | 0 | 35 | 0 | 42 | 0 | 32 | 0 | G2 |
| Example 107 | 77 | 0 | 53 | 0 | 72 | 0 | 47 | 0 | G3 |
| Example 108 | 27 | 26 | 18 | 18 | 25 | 24 | 16 | 15 | G3 |
| Example 109 | 51 | 50 | 37 | 35 | 43 | 40 | 29 | 25 | G3 |
| Example 110 | 72 | 65 | 48 | 44 | 67 | 61 | 45 | 41 | G2 |
| Example 111 | 28 | 0 | 22 | 0 | 38 | 0 | 31 | 0 | G3 |
| Example 112 | 51 | 0 | 43 | 0 | 63 | 0 | 52 | 0 | G3 |
| Example 113 | 72 | 0 | 67 | 0 | 84 | 0 | 73 | 0 | G2 |
| Example 114 | 0 | 0 | 0 | 0 | 44 | 0 | 31 | 0 | G3 |
| Example 115 | 7 | 0 | 9 | 0 | 54 | 0 | 42 | 0 | G3 |
| Example 116 | 37 | 34 | 26 | 24 | 38 | 35 | 27 | 25 | G3 |
| Example 117 | 48 | 43 | 40 | 34 | 52 | 47 | 35 | 29 | G3 |
| Example 118 | 75 | 72 | 63 | 59 | 75 | 72 | 63 | 59 | G2 |
| Example 119 | 83 | 79 | 76 | 71 | 83 | 79 | 76 | 71 | G2 |
| Example 120 | 49 | 0 | 42 | 0 | 7 | 0 | 3 | 0 | G3 |
| Example 121 | 48 | 0 | 43 | 0 | 52 | 0 | 48 | 0 | G3 |
| Example 122 | 68 | 0 | 64 | 0 | 74 | 0 | 71 | 0 | G2 |
| Example 123 | 81 | 0 | 74 | 0 | 85 | 0 | 81 | 0 | G2 |
| Example 124 | 48 | 41 | 45 | 42 | 6 | 6 | 2 | 2 | G3 |
| Example 125 | 52 | 44 | 43 | 41 | 51 | 48 | 46 | 43 | G3 |
| Example 126 | 68 | 64 | 60 | 56 | 76 | 73 | 71 | 66 | G3 |
| Example 127 | 79 | 77 | 71 | 69 | 86 | 82 | 79 | 75 | G3 |
| Example 128 | 0 | 0 | 0 | 0 | 0 | 0 | 0 | 0 | G4 |
| Example 129 | 0 | 0 | 0 | 0 | 0 | 0 | 0 | 0 | G5 |

The meanings of the symbols and the like in Tables 3 and 4 are as follows.

First toner particles A: Toner particles satisfying Condition (A), Condition (B1), Condition (C), and Condition (D)

First toner particles B: Toner particles satisfying Condition (A'), Condition (B1'), Condition (C'), and Condition (D')

Condition (A'): The aspect ratio of the domain of the crystalline resin is 10 or more and 40 or less Condition (B1'): The major axis length of the domain of the crystalline resin is 0.8 μm or more and 1.5 μm or less Condition (C'): The angle between an extension line of the major axis of the domain of the crystalline resin and a tangent line at a contact point where the extension line is in contact with the surface of the toner particle is 75 degrees or more and 90 degrees or less Condition (D'): The crossing angle between extension lines of the major axes in two domains of the crystalline resins is 60 degrees or more and 90 degrees or less Second toner particles A: Toner particles satisfying Condition (A), Condition (B2), Condition (C), and Condition (D)

Second toner particles B: Toner particles satisfying Condition (A'), Condition (B2'), Condition (C'), and Condition (D')

Condition (A'): The aspect ratio of the domain of the crystalline resin is 10 or more and 40 or less Condition (B2'): The ratio of the major axis length of the domain of the crystalline resin to the maximum diameter of the toner particle is 13% or more and 30% or less Condition (C'): The angle between an extension line of the major axis of the domain of the crystalline resin and a tangent line at a contact point where the extension line is in contact with the surface of the toner particle is 75 degrees or more and 90 degrees or less Condition (D'): The crossing angle between extension lines of the major axes in two domains of the crystalline resins is 60 degrees or more and 90 degrees or less AR: The aspect ratio of the domain of crystalline resin Lcry: The major axis length of the domain of the crystalline resin θA: The angle between an extension line of the major axis of the domain of the crystalline resin and a tangent line at a contact point where the extension line is in contact with the surface of the toner particle θB: The crossing angle between extension lines of the major axes in two domains of the crystalline resins Shortest distance: The shortest distance between the domain of the release agent and the surface (that is, the outer edge) of the toner particle The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrostatic charge image developing toner comprising:

a toner particle that contains a binder resin having an acid value of 5 mgKOH/g or more and 25 mgKOH/g or less, and a colorant, wherein the colorant comprises a pigment having an isoindoline skeleton, wherein a total Net intensity NA of an alkali metal and an alkaline earth metal, which is measured by fluorescent X-ray analysis, in the toner particle is 1.50 kcps or more and 4.00 kcps or less, wherein a proportion of the pigment having an isoindoline skeleton in the colorant in the toner is 50% by mass or more and 100% by mass or less, wherein the toner particle contains an amorphous resin and a crystalline resin as the binder resin, and in a case where a cross section of the toner particle is observed, at least two domains of crystalline resins satisfy Condition (A), Condition (B1), Condition (C), and Condition (D), Condition (A): an aspect ratio of the domain of the crystalline resin is 5 or more and 40 or less;

Condition (B1): a major axis length of the domain of the crystalline resin is 0.5 μm or more and 1.5 μm or less;

Condition (C): an angle between an extension line of the major axis of the domain of the crystalline resin and a tangent line at a contact point where the extension line is in contact with a surface of the toner particle is 60 degrees or more and 90 degrees or less; and Condition (D): a crossing angle between extension lines of the major axes in two domains of the crystalline resins is 45 degrees or more and 90 degrees or less.

2. An electrostatic charge image developing toner comprising:

a toner particle that contains a binder resin having an acid value of 5 mgKOH/g or more and 25 mgKOH/g or less, and a colorant, wherein the colorant comprises a pigment having an isoindoline skeleton, wherein a total Net intensity $N_A$ of an alkali metal and an alkaline earth metal, which is measured by fluorescent X-ray analysis, in the toner particle is 1.50 kcps or more and 4.00 kcps or less, wherein a proportion of the pigment having an isoindoline skeleton in the colorant in the toner is 50% by mass or more and 100% by mass or less, wherein the toner particle contains an amorphous resin and a crystalline resin as the binder resin, and in a case where a cross section of the toner particle is observed, at least two domains of crystalline resins satisfy Condition (A), Condition (B2), Condition (C), and Condition (D), Condition (A): an aspect ratio of the domain of the crystalline resin is 5 or more and 40 or less;

Condition (B2): a ratio of a major axis length of the domain of the crystalline resin to a maximum diameter of the toner particle in at least one of the two domain of the crystalline resins is 10% or more and 30% or less;

Condition (C): an angle between an extension line of the major axis of the domain of the crystalline resin and a tangent line at a contact point where the extension line is in contact with a surface of the toner particle is 60 degrees or more and 90 degrees or less; and Condition (D): a crossing angle between extension lines of the major axes in two domains of the crystalline resins is 45 degrees or more and 90 degrees or less.

3. The electrostatic charge image developing toner according to claim 1, wherein the Net intensity NA is 2.00 kcps or more and 3.50 kcps or less.

4. The electrostatic charge image developing toner according to claim 1, wherein a Net intensity $N_{Cl}$ of Cl, which is measured by fluorescent X-ray analysis, in the toner particle is 0.05 kcps or more and 1.00 kcps or less.

5. The electrostatic charge image developing toner according to claim 4, wherein the Net intensity $N_{Cl}$ of Cl is 0.10 kcps or more and 0.80 kcps or less.

6. The electrostatic charge image developing toner according to claim 4, wherein a ratio ($N_A/N_{Cl}$) of the total Net intensity $N_A$ of the alkali metal and the alkaline earth metal to the Net intensity $N_{Cl}$ of Cl is 3 or more and 50 or less.

7. The electrostatic charge image developing toner according to claim 1, wherein the alkali metal and the alkaline earth metal contain at least one selected from the group consisting of Na, Mg, and Ca.

8. The electrostatic charge image developing toner according to claim 1, wherein the alkali metal and the alkaline earth metal contain at least one selected from the group consisting of Na and Ca.

9. The electrostatic charge image developing toner according to claim 1, wherein the amorphous resin contains an amorphous polyester resin and the crystalline resin contains a crystalline polyester resin.

10. The electrostatic charge image developing toner according to claim 1, wherein the amorphous resin contains a styrene acrylic resin.

11. The electrostatic charge image developing toner according to claim 1, wherein the amorphous resin contains a polyester resin segment and a styrene acrylic resin segment, and the crystalline resin contains a crystalline polyester resin.

12. The electrostatic charge image developing toner according to claim 1, wherein the toner particle contains C. I. Pigment Yellow 185 as the pigment having an isoindoline skeleton.

13. The electrostatic charge image developing toner according to claim 1, wherein the toner particle contains, as a release agent, an ester compound of a higher fatty acid having 10 to 25 carbon atoms and a monohydric or polyhydric alcohol.

14. The electrostatic charge image developing toner according to claim 1, wherein the toner particle contains a release agent, and in a case where the cross section of the toner particle is observed, a domain of the release agent is present inside the toner particle at a depth of 50 nm or more from the surface of the toner particle.

15. The electrostatic charge image developing toner according to claim 1, wherein a content of the toner particle is 40% by number or more with respect to all toner particles in the toner.

16. The electrostatic charge image developing toner according to claim 15, wherein the content of the toner particles is 70% by number or more with respect to all the toner particles in the toner.

17. An electrostatic charge image developer comprising:

the electrostatic charge image developing toner according to claim 1.

* * * * *